United States Patent
Basak et al.

(10) Patent No.: US 12,237,940 B1
(45) Date of Patent: *Feb. 25, 2025

(54) USAGE-BASED DEVICE NAMING AND GROUPING

(71) Applicant: Amazon Technologies, Inc., Seattle, WA (US)

(72) Inventors: Aniruddha Basak, Seattle, WA (US); Yu Liu, Seattle, WA (US); George Strajan, Seattle, WA (US); Hersh Sridhar Iyer, Redmond, WA (US); Sara Parker Hillenmeyer, Seattle, WA (US); William Evan Welbourne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,192

(22) Filed: Sep. 29, 2023

Related U.S. Application Data

(63) Continuation of application No. 17/847,485, filed on Jun. 23, 2022, now Pat. No. 11,784,843, which is a continuation of application No. 17/156,875, filed on Jan. 25, 2021, now Pat. No. 11,374,780, which is a continuation of application No. 16/835,954, filed on Mar. 31, 2020, now Pat. No. 10,904,027.

(51) Int. Cl.
*H04L 29/06* (2006.01)
*H04L 12/28* (2006.01)

(52) U.S. Cl.
CPC ...... *H04L 12/2812* (2013.01); *H04L 12/2816* (2013.01); *H04L 12/2829* (2013.01); *H04L 12/2832* (2013.01)

(58) Field of Classification Search
CPC ............ H04L 12/2812; H04L 12/2816; H04L 12/2829
USPC ........................................................ 709/217
See application file for complete search history.

(56) References Cited

U.S. PATENT DOCUMENTS

| | | |
|---|---|---|
| 5,581,760 A | 12/1996 | Atkinson et al. |
| 8,291,046 B2 | 10/2012 | Farber et al. |
| 8,880,793 B2 | 11/2014 | Nagineni |
| 9,113,286 B1 | 8/2015 | Adams et al. |
| 9,553,841 B1 | 1/2017 | Skinner et al. |
| 10,674,001 B1 | 6/2020 | Rao et al. |
| 10,747,894 B1 | 8/2020 | Cline et al. |
| 10,855,483 B1 | 12/2020 | Ramesh et al. |

(Continued)

OTHER PUBLICATIONS

Office Action for U.S. Appl. No. 17/847,485, mailed on Jan. 20, 2023, Aniruddha Basak, "Usage-Based Device Naming and Grouping", 5 pages.

*Primary Examiner* — Jude Jean Gilles
(74) *Attorney, Agent, or Firm* — Lee & Hayes, P.C.

(57) ABSTRACT

Systems and methods for usage-based device naming and grouping are disclosed. For example, trigger events that indicate when a device should be renamed, added to a device group, and/or added to a routine may be determined. Usage data representing usage of the device may be received and utilized to determine if a trigger event occurs. When a trigger event occurs, a recommendation for renaming, grouping, etc. may be determined and sent to a user device. Upon acceptance of the recommendation, the device may be renamed, grouped, and/or added to a routine.

20 Claims, 10 Drawing Sheets

(56) References Cited

U.S. PATENT DOCUMENTS

| | | |
|---|---|---|
| 10,904,027 B1 * | 1/2021 | Basak .................. H04L 12/2829 |
| 11,132,172 B1 | 9/2021 | Naik et al. |
| 11,374,780 B1 * | 6/2022 | Basak .................. H04L 12/2829 |
| 11,784,843 B1 * | 10/2023 | Basak .................. H04L 12/2829 |
| 2008/0235358 A1 | 9/2008 | Moribe et al. |
| 2009/0119274 A1 | 5/2009 | Tsuzuki et al. |
| 2010/0198724 A1 * | 8/2010 | Thomas .................. G06Q 30/02 |
| | | 705/40 |
| 2010/0299260 A1 * | 11/2010 | Thomas ............. G06Q 30/0226 |
| | | 705/44 |
| 2012/0268770 A1 | 10/2012 | Fukuda |
| 2013/0179500 A1 | 7/2013 | Kacin et al. |
| 2013/0232195 A1 * | 9/2013 | Ruan .................... H04L 65/762 |
| | | 709/203 |
| 2014/0173687 A1 * | 6/2014 | Dimitrakos ............ G16H 10/60 |
| | | 726/1 |
| 2016/0149716 A1 | 5/2016 | Raj |
| 2017/0063948 A1 | 3/2017 | Shroff et al. |
| 2017/0223128 A1 | 8/2017 | Shuvaev et al. |
| 2018/0337686 A1 * | 11/2018 | Diegmann ......... G01R 13/0254 |
| 2019/0281878 A1 * | 9/2019 | Tang .................... A61B 5/4866 |
| 2020/0265530 A1 | 8/2020 | Lee et al. |
| 2020/0265531 A1 | 8/2020 | Lee et al. |
| 2020/0265532 A1 | 8/2020 | Lee et al. |
| 2020/0265533 A1 | 8/2020 | Lee et al. |
| 2020/0265534 A1 | 8/2020 | Lee et al. |
| 2021/0090578 A1 | 3/2021 | Trapp et al. |

\* cited by examiner

USAGE-BASED DEVICE NAMING AND GROUPING

RELATED APPLICATIONS

This application claims priority to and is a continuation of U.S. patent application Ser. No. 17/847,485, filed on Jun. 23, 2022, which will issue as U.S. Pat. No. 11,784,843 on Oct. 10, 2023, which claims priority to and is a continuation of U.S. patent application Ser. No. 17/156,875, filed on Jan. 25, 2021, now known as U.S. Pat. No. 11,374,780 which issued on Jun. 28, 2022, which claims priority to and is a continuation of U.S. patent application Ser. No. 16/835,954, filed on Mar. 31, 2020, now known as U.S. Pat. No. 10,904,027, which issued on Jan. 26, 2021, the entire contents of which are incorporated herein by reference.

BACKGROUND

Electronic devices can now be used for many purposes such as controlling lights, locks, doorbells, plugs, appliances, thermostats, etc. These electronic devices may be given naming indicators and/or may be grouped with other devices. Described herein are improvements in technology and solutions to technical problems that can be used to, among other things, improve use of electronic devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
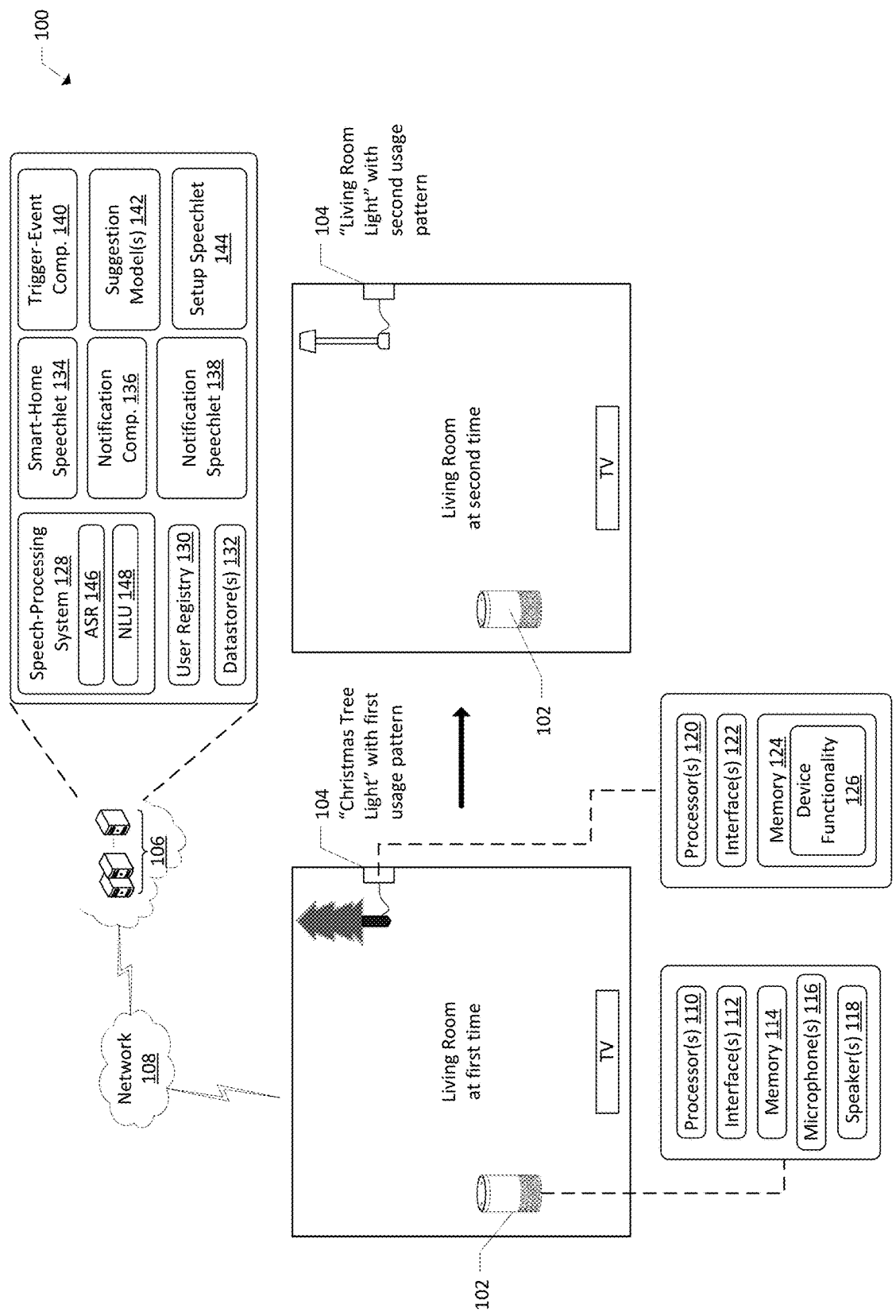
FIG. 1 illustrates a schematic diagram of an example environment for usage-based device naming and grouping.

Systems and methods for usage-based device naming and grouping are disclosed. Take, for example, an environment such as a home where one or more electronic devices may be present. In some examples, at least a portion of those electronic devices may be configured to perform one or more operations, such as turning on and/or off, locking and/or unlocking, setting a temperature, etc. These electronic devices may be associated with one or more naming indicators, such as "kitchen light," "front door lock," "garage security camera," etc., which may include default naming indicators provided by a manufacturer of a given device, by a speech-processing system associated with the given device, and/or by one or more users associated with the given device, for example.

The environments may include one or more of the electronic devices that may be utilized by users. For example, the electronic devices may include voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboards, etc.), and other types of connected electronic devices (e.g., lights, plugs, locks, thermostats, appliances, televisions, clocks, smoke detectors, doorbells, cameras, motion/magnetic/other security-system sensors, etc.). These electronic devices may be situated in a home, a place a business, healthcare facility (e.g., hospital, doctor's office, pharmacy, etc.), vehicle (e.g., airplane, truck, car, bus, etc.), a public forum (e.g., shopping center, store, etc.), among other examples.

In examples, it may be desirable to rename a given electronic device and/or to associate more than one naming indicator and/or naming alias with the electronic device. It may also be desirable to determine when to associate a given electronic device with a device group and/or a routine. In these situations, device-usage data indicating how a given electronic device and/or associated electronic devices are being utilized may be used to determine if a trigger event has occurred that indicates a device is to be renamed, added to a group, and/or added to a routine. For example, users may interact with the electronic devices, and data representing those interactions may be stored in association with a user registry and/or one or more other types of datastores. For example, a user may provide a command, such as a user utterance, to a voice-enabled device. In response, the voice-enabled device may generate audio data representing the user utterance and may send the audio data to a remote system for processing. The remote system may determine intent data associated with the audio data and may determine one or more speechlets or other types of applications designated as being capable of r helping respond. In instances where the user utterance represents a request to operate a smart-home connected device, a smart-home speechlet may be called to service the intent data. The smart-home speechlet may process the intent data and in turn generate request data that is sent to an internet-of-things (IoT) component. In response, the IoT component determines which connected device(s) associated with a user profile is to be acted upon. The internet-of-things component may provide information about the connected devices associated with the voice-enabled device, and the remote system may utilize this information to generate a command for operating the connected device as requested by the user. The devices may be operated in other ways as well, such as by commands sent from user devices such as phones, tablets, and/or other computing devices, and/or via input received on the devices themselves. Some or all of this device-usage data may be stored in association with the user registry and/or the datastores (e.g., with user's informed consent where prudent/needed).

A notification component may be configured to utilize data from a trigger-event component to determine when to present recommendations for renaming electronic devices and/or for device groupings utilizing the device-usage data. For example, one or more suggestion models, which may be machine learning models, may be configured to determine one or more trigger events that, when occurring, indicate that usage of a given electronic device has changed in a way where renaming of the device and/or grouping of the device may be recommended. For example, the suggestion models may be configured to determine trigger events such as, but not limited to, when prior usage recommendations, which may be described as hunches, have been ignored and/or declined and/or have been determined multiple times, such as more than a threshold number of times. In these examples, the usage recommendations may indicate that the device in question has a usage pattern that is inconsistent with its current naming indicator and/or device group affiliation. The trigger events may also include receiving audio data representing a user request to operate the device but where the user request includes a device identifier that is not a currently-assigned naming indicator and/or is not synonymous with the currently-assigned naming indicator. In these examples, the audio data may indicate that the device identifier being uttered by a user indicates that a different naming indicator is to be associated with the device in question.

The trigger events may also include an indication that a usage pattern associated with a given device has changed from a historical usage pattern of the device. For example, a device may have a naming indicator of "Christmas Light" and may be operated in the same or a similar fashion during a given period of time. Thereafter, the usage pattern of the device may change, such as by a threshold degree, which may represent a trigger event and may indicate that the naming indicator of the device is to be changed. In still other examples, the trigger event may be based at least in part on the initial and/or current naming indicator associated with a device and the usage data. For example, certain naming indicators may include words that indicate that the device will be temporarily used for a given purpose but will be used for a different purpose at a later time. These devices may be more readily identified as devices for recommending renaming and/or regrouping, among other things. Additional trigger events may include device-usage patterns in a given season (astronomical, holiday, entertainment-based such as a particular sports season, etc.), or otherwise predefined period of time and a corresponding usage pattern change.

Additionally, or alternatively, the trigger events may include determining that a given usage pattern associated with a device is the same or similar to one or more reference usage patterns associated with one or more other devices and/or devices having the same or a similar device type to the device in question. In these examples, the system may determine, based at least in part on the similar usage pattern, that the device in question is likely similar to the other devices, and the naming indicators of the other devices may be utilized to recommend a naming indicator for the device in question. It should be understood that while several example trigger events are described herein, this disclosure includes the use of any device-usage data to determine when renaming and/or grouping recommendations is to be presented. It should also be understood that the suggestion models, particularly when those models include machine learning models, receive usage data and/or feedback data associated with the renaming recommendations, those suggestion models may determine or otherwise "learn" one or more additional trigger events that indicate when a renaming recommendation is to be presented.

The suggestion models may provide data indicating the trigger event to the trigger-event component, which may be configured to analyze usage data to determine when the one or more trigger events occur. In examples, when the trigger-event component determines that a trigger event has occurred, the trigger-event component and/or another component of the remote system may utilize the device-usage data and/or the indication of the trigger event to determine what naming indicator to recommend for replacing the current naming indicator or for associating with the device in addition to the current naming indicator. In other examples, the trigger event may query one or more other components for determining the naming indicator and/or for data for determining the naming indicator. For example, based at least in part on determining that the trigger event has occurred, a content injection framework or other type of push notification component(s) may be utilized to interface with a user for acquiring additional information for determining the naming indicator. For example, via voice user interface, the notification component may cause natural language content to be generated and sent to a voice-enabled device to output audio, where the content requests the additional information from the user. In examples, the notification component may be configured to determine when to query the notification speechlet, such as when audio data representing a user utterance is received, when a wake word is detected, etc. The notification speechlet may, when directed by the notification component, send the command to the voice-enabled device, which may output audio requesting the additional information about the device. For example, the audio may include an indication that the trigger event has been detected and/or a request for the additional information. The user may, in response to the audio output by the voice-enabled device, speak a user utterance and microphones of the voice-enabled device may generate corresponding audio data. An automatic speech recognition component of the remote system may receive the audio data and may utilize the audio data to generate text data representing the user utterance. A natural language understanding component may be configured to utilize the text data to determine one or more words that may correspond to the naming indicator for the device and/or the naming aliases to associate with the device. For example, words identified as adjectives and/or other descriptors of the device may be tagged and utilized for determining the naming indicators and/or naming aliases. The data may be provided to the suggestion models, which may utilize this data to generate a suggested naming indicator and/or to generate a suggested device grouping for the device in question.

Once a recommended naming indicator and/or grouping recommendation is determined, the notification component may be configured to send the recommendation to the voice-enabled device and/or a user device for presenting to the user. When sent to a voice-enabled device, the voice-enabled device may output audio representing the recommendation and may receive a responsive user utterance that confirms or rejects the recommendation. User input data corresponding to the responsive user utterance may be utilized to determine that the recommended naming indicator is to be or is not to be associated with the device. In examples where the recommendation is sent to a user device that includes a display, the user device may display the recommendation and receive user input, such as in the form of touch input. In examples where the recommended naming indicator is to be associated with the device, a setup speechlet may be configured to generate data indicating the association between the naming indicator and the device, and that data may be stored in association with the user registry for use by the remote system in performing operations associated with the device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for usage-based device naming and grouping. The system 100 may include, for example, electronic devices, which may include communal devices, personal devices, and/or devices configured with sensors to detect environmental changes. In certain examples, at least some of the devices may be voice-enabled devices 102 (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and connected devices 104 (e.g., lights, plugs, locks, thermostats, appliances, televisions, clocks, smoke detectors, doorbells, cameras, motion/magnetic/other security-system sensors, etc.). These electronic devices may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The system 100 may also include one or more personal devices, which may be electronic devices, such as a mobile phone, tablet, laptop, wearable device, and/or other computing device that is specifically associated with a given user profile. The electronic devices and the personal devices may be configured to send data to and/or receive data from a remote system 106, such as via a network 108. Additionally, it should be understood that a given space and/or environment may include numerous electronic devices and/or personal devices. It should also be understood that when a "space" or "environment" is used herein, those terms mean an area and not necessarily a given room, building, or other structure, unless otherwise specifically described as such.

The voice-enabled devices 102 may include one or more components, such as, for example, one or more processors 110, one or more network interfaces 112, memory 114, one or more microphones 116, and/or one or more speakers 118. The microphones 116 may be configured to capture audio, such as user utterances, and generate corresponding audio data. The speakers 118 may be configured to output audio, such as audio corresponding to audio data received from another device and/or the system 104. It should be understood that while several examples used herein include a voice-enabled device 102 that allows users to interact therewith via user utterances, one or more other devices, which may not include a voice interface, may be utilized instead of or in addition to voice-enabled devices 102. In these examples, the device may be configured to send and receive data over the network 108 and to communicate with other devices in the system 100. As such, in each instance where a voice-enabled device 102 is utilized, a computing device that does not include a voice interface may also or alternatively be used. It should be understood that when voice-enabled devices 102 are described herein, those voice-enabled devices 102 may include phones, computers, and/or other computing devices.

The connected devices 104 may include one or more components, such as, for example, one or more processors 120, one or more network interfaces 122, and/or memory 124. The memory 124 may include components such as, for example, device functionality 126. As described above, the connected devices 104 may include devices such as lights, plugs, locks, thermostats, appliances, televisions, clocks, smoke detectors, doorbells, cameras, motion/magnetic/other security-system sensors, etc. In these examples, the device functionality 126 may include components that configure the connected devices 104 to perform one or more operations, such as turning lights on and/or off, allowing flow of electricity and/or prohibiting flow of electricity, unlocking and/or locking, adjusting a temperature, and/or performing operations associated with appliances, televisions, clocks, smoke detectors, doorbells, cameras, security-system sensors, etc.

The remote system 106 may include components such as, for example, a speech-processing system 128, a user registry 130, one or more datastores 132, a smart-home speechlet 134, a notification component 136, a notification speechlet 138, a trigger-event component 140, one or more suggestion models 142, and/or a setup speechlet 144. It should be understood that while the speech-processing system 128 and the other components are depicted as separate from each other in FIG. 1, some or all of the components may be a part of the same system. The speech-processing system 128 may include an automatic speech recognition component (ASR) 146 and/or a natural language understanding component (NLU) 148. Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component 148 and/or as determined from user input via a computing device. Skills may be configured to utilize the intent to output data for input to a text-to-speech component, a link or other resource locator for audio data, and/or a command to a device, such as the voice-enabled device 102.

In instances where a voice-enabled device 102 is utilized, skills may extend the functionality of connected devices 104 that can be controlled by users utilizing a voice-user interface. In some examples, skills may be a type of application that may be useable in association with connected devices 104 and may have been developed specifically to work in connection with given connected devices 104. Additionally, skills may be a type of application that may be useable in association with the voice-enabled device 102 and may have been developed specifically to provide given functionality to the voice-enabled device 102. In examples, a non-skill application may be an application that does not include the functionality of a skill. Speechlets, as described herein, may be a type of application that may be usable in association with voice-enabled devices 102 and may have been developed specifically to work in connection with voice interfaces of voice-enabled devices 102. The application(s) may be configured to cause processor(s) to receive information associated with interactions with the voice-enabled device 102. The application(s) may also be utilized, in examples, to receive input, such as from a user of a personal device and/or the voice-enabled device 102, and send data and/or instructions associated with the input to one or more other devices.

The components of the remote system 106 are described in detail below. In examples, some or each of the components of the remote system 106 may include their own processor(s), network interface(s), and/or memory. As such, by way of example, the speech-processing system 128 may include and/or be associated with processor(s), network interface(s), and/or memory. The other components of the remote system 106, such as the trigger-event component 140, may include and/or be associated with different processor(s), network interface(s), and/or memory, or one or more of these components may utilize some or all of the same processor(s), network interface(s), and/or memory utilized by the speech-processing system 128. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 130 may be configured to determine and/or generate associations between users, user accounts, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers, such as naming identifiers, associated with a given user account, as well as device types associated with the device identifiers. The user registry 130 may also include information indicating user account identifiers, naming indicators of devices associated with user accounts, and/or associations between devices, such as the voice-enabled devices 102 and/or the connected devices 104. The user registry 130 may also include information associated with usage of the voice-enabled devices 102 and/or the connected devices 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The datastores 132 may be configured to receive and/or generate data associated with use of the voice-enabled devices 102 and/or the connected devices 104. For example, the devices 102, 104 may be utilized to provide responses to user requests and/or other interactions may occur between the voice-enabled devices 102 and connected devices 104 and/or one or more users. Usage data may be identified, determined, and/or generated that indicates some or each of these interactions. Timing data may also be identified that indicates a time at which some or each of these interactions took place. The datastores 132 may also store data associated with detected events by sensors of the devices 102, 104. It should be understood that while the user registry 130 and the datastores 132 are illustrated as separate components, the user registry 130 and the datastores 132 may be the same component. In examples, the datastores 132 may store data utilized by the trigger-event component 140 and/or the suggestion models 142, as discussed more fully herein.

The speech-processing system 128 may be configured to receive audio data from the voice-enabled devices 102 and/or other devices and perform speech-processing operations. For example, the ASR component 146 may be configured to generate text data corresponding to the audio data, and the NLU component 148 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "turn on Light A," the NLU component 148 may identify a "turn on" intent and the payload may be "Light A." In this example where the intent data indicates an intent to operate a device with a naming indicator of "Light A," the speech-processing system 128 may call one or more speechlets to effectuate the intent. Speechlets, as described herein may otherwise be described as applications and may include functionality for utilizing intent data to generate directives and/or instructions. For example, a smart-home speechlet 134 may be called when the intent indicates that an action is to be performed in association with a connected device 104. The speechlet 134 may be designated as being configured to handle the intent of generating and/or sending commands for operations of connected devices 104, for example. The speechlet 134 may receive the intent data and/or other data associated with the user utterance from the NLU component 148, such as by an orchestrator of the remote system 106, and may perform operations to instruct the connected device 104 to perform an operation. The remote system 106 may generate audio data confirming that a given connected device 104 is to be operated, such as by a text-to-speech component. The audio data may be sent from the remote system 106 to the voice-enabled device 102 for output of corresponding audio by the speakers 118 of the voice-enabled device 102.

In examples, in may be desirable to rename a given device 102, 104 and/or to associate more than one naming indicator and/or naming alias with the device 102, 104. It may also be desirable to determine when to associate a given device 102, 104 with a device group and/or when to associate the device 102, 104 with a routine. In these situations, device-usage data indicating how a given device 102, 104 is being utilized may be used to determine if a trigger event has occurred that indicates a device 102, 104 is to be renamed and/or added to a group and/or routine. For example, users may interact with the devices 102, 104, and data representing those interactions may be stored in association with the user registry 130 and/or the datastores 132. For example, a user may provide a command, such as a user utterance, to a voice-enabled device 102. The voice-enabled device 102 may generate audio data representing the user utterance and may send the audio data to the remote system 106 for processing. The remote system 106, and particularly the NLU component 148, may determine intent data associated with the audio data and may determine one or more speechlets, such as the smart-home speechlet 134, or otherwise applications designated as being capable of handling the intent data. In instances where the user utterance represents a request to operate a smart-home connected device, the smart-home speechlet 134 may be called to service the intent data. The smart-home speechlet 134 may send a request to an internet-of-things component to determine which connected device 104 associated with the voice-enabled device 102 is to be acted upon. The internet-of-things component may provide information about the connected devices 104 associated with the voice-enabled device 102, and the remote system 106 may utilize this information to generate a command for operating the connected device 104 as requested by the user. Some or all of this device-usage data may be stored in association with the user registry 130 and/or the datastores 132.

The notification component 136 may be configured to utilize data from the trigger-event component 140 to determine when to present recommendations for renaming devices 102, 104 and/or for device groupings utilizing the device-usage data. For example, one or more of the suggestion models 142, which may be machine learning models, may be configured to determine one or more trigger events that, when occurring, indicate that usage of a given device 102, 104 has changed in a way where renaming of the device 102, 104 and/or grouping of the device 102, 104 may be recommended. For example, the suggestion models 142 may be configured to determine trigger events such as, but not limited to, when prior usage recommendations, which may be described as hunches, have been ignored and/or declined and/or have been determined multiple times, such as more than a threshold number of times. In these examples, the usage recommendations may indicate that the device 102, 104 in question has a usage pattern that is inconsistent with its current naming indicator and/or device group affiliation. The usage recommendations described herein may include, for example, recommending that a "light" connected device 104 be turned off at a given time and/or on a given day based at least in part on historical usage data associated with that connected device 104 and/or other connected devices having the same device type or otherwise having an association with the connected device 104.

The trigger events may also include receiving audio data representing a user request to operate the device 102, 104 but utilizing a device identifier that is not a currently-assigned naming indicator and/or is not synonymous with the currently-assigned naming indicator. In these examples, the audio data may indicate that the device identifier being uttered by a user indicates a different naming indicator that is to be associated with the device in question. For example, the naming indicator of a given connected device 104 may be "living room light." However, a user may call the connected device 104 something other than the "living room light" when requesting operation of the device. In these examples, the user may call the connected device 104 by a naming indicator that is not synonymous with "living room," such as the "couch light." The suggestions models 142 and/or one or more other components of the remote system 106 may determine that a trigger event has occurred when usage data indicates that "couch light" and "living room light" may be associated with the same device. For example, operation of the connected device 104 by a given voice-enabled device 102 may occur more frequently when the utterance includes "couch light" than with any other voice-enabled devices 102, and/or the device in question may be the only "light" type connected device 104 associated with the voice-enabled device 102.

The trigger events may also include an indication that a usage pattern associated with a given device 102, 104 has changed from a historical usage pattern of the device 102, 104. For example, a device may have a naming indicator of "Christmas Light" and may be operated in the same or a similar fashion during a given period of time. Thereafter, the usage pattern of the device 102, 104 may change, such as by a threshold degree, which may represent a trigger event and may indicate that the naming indicator of the device 102, 104 is to be changed. In still other examples, the trigger event may be based at least in part on the initial and/or current naming indicator associated with a device 102, 104 and the usage data. For example, certain naming indicators may include words that indicate that the device 102, 104 will be temporarily used for a given purpose but will be used for a different purpose at a later time. These devices 102, 104 may be more readily identified as devices 102, 104 for recommending renaming and/or regrouping. Additional trigger events may include device-usage patterns in a given season or otherwise predefined period of time and a corresponding usage change.

Additionally, or alternatively, the trigger events may include determining that a given usage pattern associated with a device 102, 104 is the same or similar to one or more reference usage patterns associated with one or more other devices 102, 104 and/or devices 102, 104 having the same or a similar device type to the device 102, 104 in question. In these examples, the system 106 may determine, based at least in part on the similar usage pattern, that the device 102, 104 in question is likely similar to the other devices 102, 104, and the naming indicators of the other devices 102, 104 may be utilized to recommend a naming indicator for the device 102, 104 in question. It should be understood that while several example trigger events are described herein, this disclosure includes the use of any device-usage data to determine when renaming and/or grouping recommendations should be presented. It should also be understood that the suggestion models 142, particularly when those models include machine learning models, receive usage data and/or feedback data associated with the renaming recommendations, those suggestion models may determine or otherwise "learn" one or more additional trigger events that indicate when a renaming recommendation is to be presented.

The suggestion models 142 may provide data indicating the trigger event to the trigger-event component 140, which may be configured to analyze usage data to determine when the one or more trigger events occur. In examples, when the trigger-event component 140 determines that a trigger event has occurred, the trigger-event component 140 and/or another component of the remote system 106 may utilize the device-usage data and/or the indication of the trigger event to determine what naming indicator to recommend for replacing the current naming indicator or for associating with the device 102, 104 in addition to the current naming indicator. In other examples, the trigger event may query one or more other components for the naming indicator and/or for data for determining the naming indicator. For example, based at least in part on determining that the trigger event has occurred, the notification component 136 may be utilized to interface with a user for acquiring additional information for determining the naming indicator. For example, the notification component 136 may query a notification speechlet 138 to send a command to a voice-enabled device 102 to output audio requesting the additional information from the user. In examples, the notification component 136 may be configured to determine when to query the notification speechlet 138, such as when audio data representing a user utterance is received, when a wake word is detected, etc. The notification speechlet 138 may, when directed by the notification component 136, send the command to the voice-enabled device 102, which may output audio requesting the additional information about the device 102, 104. For example, the audio may include an indication that the trigger event has been detected and/or a request for the additional information. The user may, in response to the audio output by the voice-enabled device 102, speak a user utterance and microphones 116 of the voice-enabled device 102 may generate corresponding audio data. The ASR component 146 may receive the audio data and may utilize the audio data to generate text data representing the user utterance. The NLU component 148 may be configured to utilize the text data to determine one or more words that may correspond to the naming indicator for the device 102, 104 and/or the naming aliases to associate with the device 102, 104. For example, words identified as adjectives and/or other descriptors of the device 102, 104 may be tagged and utilized for determining the naming indicators and/or naming aliases. The data may be provided to the suggestion models 142, which may utilize this data to generate a suggested naming indicator and/or to generate a suggested device grouping for the device 102, 104 in questions.

Additionally, in examples, the suggestion models 142 may be configured to determine a device type to be associated with the suggested naming indicator. For example, in addition to determining that the naming indicator is to include a given name such as "living room," "dining room," "Person A," etc., the suggestion models 142 may determine that the usage pattern associated with the device corresponds to reference usage patterns associated with a given device type, such as a light, an appliance, etc. In these examples, the suggested naming indicator determined by the suggestion models 142 may include the device type indicator, such as the naming indicator is "living room light," "kitchen microwave," "Person A's clock," etc.

Once a recommended naming indicator and/or grouping recommendation is determined, the notification component 136 may be configured to send the recommendation to the voice-enabled device 102 and/or a user device for presenting to the user. When sent to a voice-enabled device 102, the voice-enabled device 102 may output audio representing the recommendation and may receive a responsive user utterance that confirms or refutes the recommendation. User input data corresponding to the responsive user utterance may be utilized to determine that the recommended naming indicator is to be or is not to be associated with the device 102, 104. In examples where the recommendation is sent to a user device that includes a display, the user device may display the recommendation and receive user input, such as in the form of touch input. In examples where the recommended naming indicator is to be associated with the device 102, 104, a setup speechlet 144 may be configured to generate data indicating the association between the naming indicator and the device 102, 104, and that data may be stored in association with the user registry 130 for use by the remote system 106 in performing operations associated with the device 102, 104.

The models 142 described herein may utilize predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning. In some examples, the models 142 described herein for determining the one or more recommended naming indicators may include Bayesian networks. Personalized Bayesian networks, may be trained using a user's usage data, can indicate the correlations between devices and thereby provide candidates for grouping suggestions. For example, "corner lamp" and "sofa light" may be usually used by a user in conjunction, despite not having similarity in naming. A Bayesian network can be trained using the user's usage history over a few weeks, and can model the two devices in a strongly connected subgraph. These structures in the graphical model can generate candidate groups. Additionally, model training, as described herein may be based at least one a number of factors, including, for example, user feedback data. The feedback data may be implicit in certain examples, such as by continued use of a device in a particular pattern or way, or explicit, such as by acceptance or rejection of previous recommendations. Datasets for training models may include, for positive examples, pairs of actual groups and member devices as a candidate. For negative examples, the datasets may include pairs of groups and device that are not in a given group. The user registry may be utilized to determine all or some combinations of eligible devices and groups as pairs. Then, a classifier may be run for validating if those pairs have a membership relationship. The features of the classifier may include, for example, usage similarity and/or name similarity. The classifier may utilize, for example, logistic regression on usage similarity scores and naming similarity scores. From there, an end-to-end multilayer perception network may utilize the usage similarity scores and naming similarity scores to score a given device-group pair and determine what, if any, recommendations to present.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models 142, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models 142. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the remote system 106 and the associated functionality of those components as described herein may be performed by one or more of the devices 102, 104 and/or personal devices. Additionally, or alternatively, some or all of the components and/or functionalities associated with the devices 102, 104 and/or personal devices may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 120, and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 120, and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 120, and/or the processor(s) described with respect to the components of the remote system 106 may possess its own local memory, which also may store program components, program data, and/or one or more operating systems.

The memory 114, 124, and/or the memory described with respect to the components of the remote system 106 may include volatile and nonvolatile memory, removable and non-removable media implemented in any method or technology for storage of information, such as computer-readable instructions, data structures, program component, or other data. Such memory 114, 124, and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 124, and/or the memory described with respect to the components of the remote system 106 may be implemented as computer-readable storage media ("CRSM"), which may be any available physical media accessible by the processor(s) 110, 120, and/or the processor(s) described with respect to the remote system 106 to execute instructions stored on the memory 114, 124, and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 124, and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 112, 122, and/or the network interface(s) described with respect to the components of the remote system 106 may enable messages between the components and/or devices shown in system 100 and/or with one or more other polling systems, as well as other networked devices. Such network interface(s) 112, 122, and/or the network interface(s) described with respect to the components of the remote system 106 may include one or more network interface controllers (NICs) or other types of transceiver devices to send and receive messages over the network 106.

For instance, each of the network interface(s) 112, 122, and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 122, and/or the network interface(s) described with respect to the components of the remote system 106 may include a wide area network (WAN) component to enable message over a wide area network.

In some instances, the remote system 106 may be local to an environment associated the devices 102, 104 and/or personal devices. For instance, the remote system 106 may be located within one or more of the devices 102, 104 and/or personal devices. In some instances, some or all of the functionality of the remote system 106 may be performed by one or more of the devices 102, 104 and/or personal devices. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
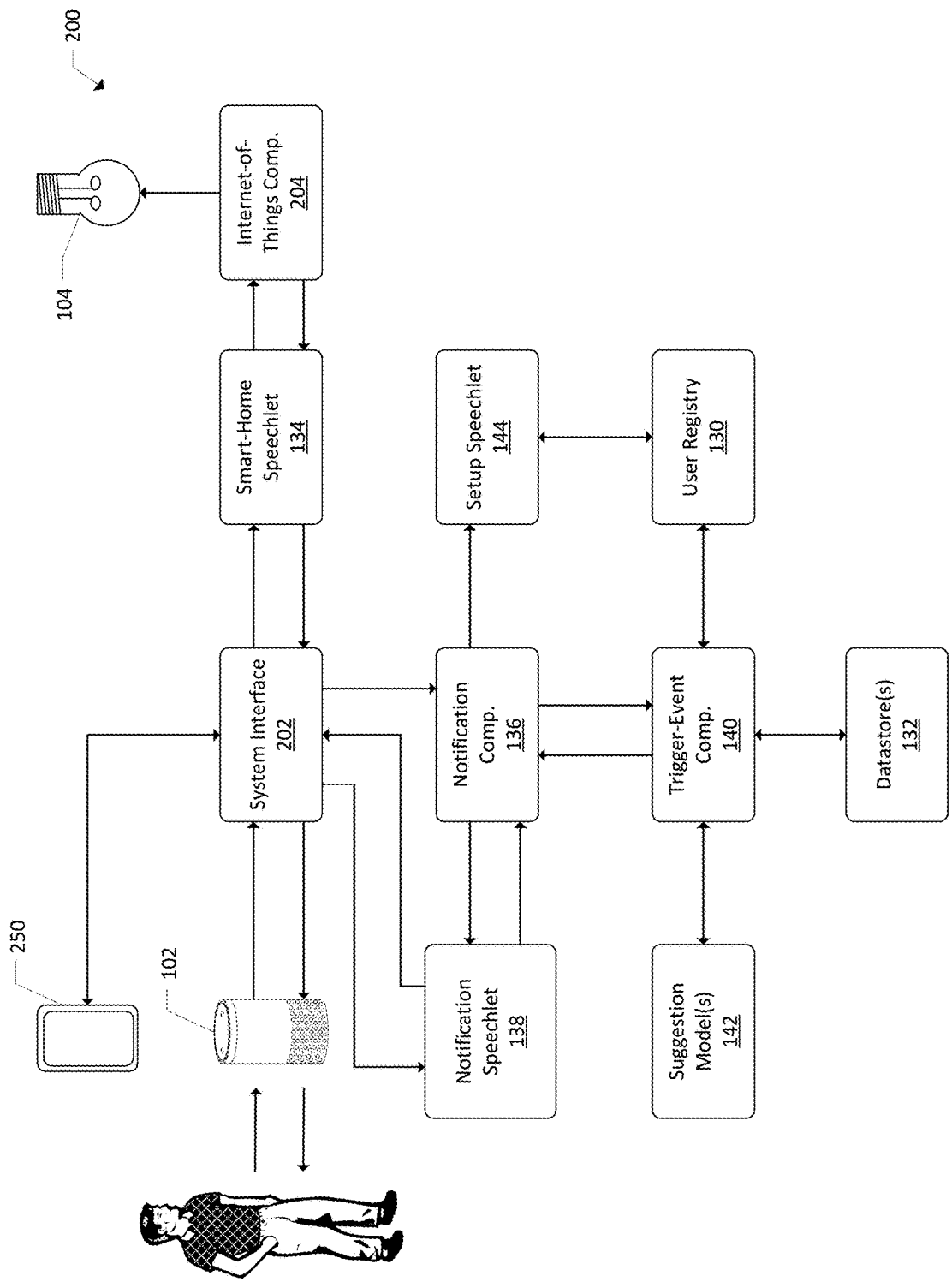
FIG. 2 illustrates a conceptual diagram of components of a system for usage-based device naming and grouping.

FIG. 2 illustrates a conceptual diagram of components of a system 200 for usage-based device naming and grouping. The system 200 may include components that are similar to those described with respect to FIG. 1. For example, the system 200 may include a user registry 130, one or more datastores 132, a smart-home speechlet 134, a notification component 136, a notification speechlet 138, a trigger-event component 140, one or more suggestion models 142, and/or a setup speechlet 144. The voice-enabled devices 102 described with respect to FIG. 1 may also be the same or similar to the voice-enabled devices 102 described in FIG. 2. The connected devices 104 described with respect to FIG. 1 may also be the same or similar to the connected devices 104 describes in FIG. 2. The system 200 may also include components such as a system interface 202 and/or an Internet-of-things components 204, which will be described below.

Utilizing FIG. 2 as an example, it may be desirable to rename a given device 102, 104 and/or to associate more than one naming indicator and/or naming alias with the device 102, 104. It may also be desirable to determine when to associate a given device 102, 104 with a device group and/or when to associate the device 102, 104 with a routine. In these situations, device-usage data indicating how a given device 102, 104 is being utilized may be used to determine if a trigger event has occurred that indicates a device 102, 104 is to be renamed and/or added to a group and/or routine. For example, users may interact with the devices 102, 104, and data representing those interactions may be stored in association with the user registry 130 and/or the datastores 132. For example, a user may provide a command, such as a user utterance, to a voice-enabled device 102. The voice-enabled device 102 may generate audio data representing the user utterance and may send the audio data to the remote system 106 for processing. The system interface 202 may receive the audio data and determine which component(s) of the remote system are to receive and/or utilize the audio data for processing. In other examples, the usage data described herein may be received from a user device 250.

For example, the system interface 202 may send the audio data to an ASR component and/or a NLU component, which may determine intent data associated with the audio data and may determine one or more speechlets, such as the smart-home speechlet 134, or otherwise applications designated as being capable of handling the intent data, to send the intent data to. In instances where the user utterance represents a request to operate a smart-home connected device 104, the smart-home speechlet 134 may be called to service the intent data. The smart-home speechlet 134 may send a request to the internet-of-things component 204 to determine which connected device 104 associated with the voice-enabled device 102 is to be acted upon. The internet-of-things component 204 may provide information about the connected devices 104 associated with the voice-enabled device 102, and the remote system 106 may utilize this information to generate a command for operating the connected device 104 as requested by the user. Some or all of this device-usage data may be stored in association with the user registry 130 and/or the datastores 132.

The notification component 136 may be configured to utilize data from the trigger-event component 140 to determine when to present recommendations for renaming devices 102, 104 and/or for device groupings utilizing the device-usage data. For example, one or more of the suggestion models 142, which may be machine learning models, may be configured to determine one or more trigger events that, when occurring, indicate that usage of a given device 102, 104 has changed in a way where renaming of the device 102, 104 and/or grouping of the device 102, 104 may be recommended. For example, the suggestion models 142 may be configured to determine trigger events such as, but not limited to, when prior usage recommendations, which may be described as hunches, have been ignored and/or declined and/or have been determined multiple times, such as more than a threshold number of times. In these examples, the usage recommendations may indicate that the device 102, 104 in question has a usage pattern that is inconsistent with its current naming indicator and/or device group affiliation. The usage recommendations described herein may include, for example, recommending that a "light" connected device 104 be turned off at a given time and/or on a given day based at least in part on historical usage data associated with that connected device 104 and/or other connected devices having the same device type or otherwise having an association with the connected device 104.

The trigger events may also include receiving audio data representing a user request to operate the device 102, 104 but utilizing a device identifier that is not a currently-assigned naming indicator and/or is not synonymous with the currently-assigned naming indicator. In these examples, the audio data may indicate that the device identifier being uttered by a user indicates a different naming indicator that is to be associated with the device in question. For example, the naming indicator of a given connected device 104 may be "living room light." However, a user may call the connected device 104 something other than the "living room light" when requesting operation of the device. In these examples, the user may call the connected device 104 by a naming indicator that is not synonymous with "living room," such as the "couch light." The suggestions models 142 and/or one or more other components of the remote system 106 may determine that a trigger event has occurred when usage data indicates that "couch light" and "living room light" may be associated with the same device. For example, operation of the connected device 104 by a given voice-enabled device 102 may occur more frequently when the utterance includes "couch light" than with any other voice-enabled devices 102, and/or the device in question may be the only "light" type connected device 104 associated with the voice-enabled device 102.

The trigger events may also include an indication that a usage pattern associated with a given device 102, 104 has changed from a historical usage pattern of the device 102, 104. For example, a device may have a naming indicator of "Christmas Light" and may be operated in the same or a similar fashion during a given period of time. Thereafter, the usage pattern of the device 102, 104 may change, such as by a threshold degree, which may represent a trigger event and may indicate that the naming indicator of the device 102, 104 is to be changed. In still other examples, the trigger event may be based at least in part on the initial and/or current naming indicator associated with a device 102, 104 and the usage data. For example, certain naming indicators may include words that indicate that the device 102, 104 will be temporarily used for a given purpose but will be used for a different purpose at a later time. These devices 102, 104 may be more readily identified as devices 102, 104 for recommending renaming and/or regrouping. Additional trigger events may include device-usage patterns in a given season or otherwise predefined period of time and a corresponding usage change.

Additionally, or alternatively, the trigger events may include determining that a given usage pattern associated with a device 102, 104 is the same or similar to one or more reference usage patterns associated with one or more other devices 102, 104 and/or devices 102, 104 having the same or a similar device type to the device 102, 104 in question. In these examples, the system 106 may determine, based at least in part on the similar usage pattern, that the device 102, 104 in question is likely similar to the other devices 102, 104, and the naming indicators of the other devices 102, 104 may be utilized to recommend a naming indicator for the device 102, 104 in question. It should be understood that while several example trigger events are described herein, this disclosure includes the use of any device-usage data to determine when renaming and/or grouping recommendations is to be presented. It should also be understood that the suggestion models 142, particularly when those models include machine learning models, receive usage data and/or feedback data associated with the renaming recommendations, those suggestion models 142 may determine or otherwise "learn" one or more additional trigger events that indicate when a renaming recommendation is to be presented.

The suggestion models 142 may provide data indicating the trigger event to the trigger-event component 140, which may be configured to analyze usage data to determine when the one or more trigger events occur. In examples, when the trigger-event component 140 determines that a trigger event has occurred, the trigger-event component 140 and/or another component of the remote system 106 may utilize the device-usage data and/or the indication of the trigger event to determine what naming indicator to recommend for replacing the current naming indicator or for associating with the device 102, 104 in addition to the current naming indicator. In other examples, the trigger event may query one or more other components for the naming indicator and/or for data for determining the naming indicator. For example, based at least in part on determining that the trigger event has occurred, the notification component 136 may be utilized to interface with a user for acquiring additional information for determining the naming indicator. For example, the notification component 136 may query a notification speechlet 138 to send a command to a voice-enabled device 102 to output audio requesting the additional information from the user. In examples, the notification component 136 may be configured to determine when to query the notification speechlet 138, such as when audio data representing a user utterance is received, when a wake word is detected, etc. The notification speechlet 138 may, when directed by the notification component 136, send the command to the voice-enabled device 102, which may output audio requesting the additional information about the device 102, 104. For example, the audio may include an indication that the trigger event has been detected and/or a request for the additional information. The user may, in response to the audio output by the voice-enabled device 102, speak a user utterance and microphones 116 of the voice-enabled device 102 may generate corresponding audio data. The ASR component 146 may receive the audio data and may utilize the audio data to generate text data representing the user utterance. The NLU component may be configured to utilize the text data to determine one or more words that may correspond to the naming indicator for the device 102, 104 and/or the naming aliases to associate with the device 102, 104. For example, words identified as adjectives and/or other descriptors of the device 102, 104 may be tagged and utilized for determining the naming indicators and/or naming aliases. The data may be provided to the suggestion models 142, which may utilize this data to generate a suggested naming indicator and/or to generate a suggested device grouping for the device 102, 104 in questions.

Once a recommended naming indicator and/or grouping recommendation is determined, the notification component 136 may be configured to send the recommendation to the voice-enabled device 102 and/or a user device for presenting to the user. When sent to a voice-enabled device 102, the voice-enabled device 102 may output audio representing the recommendation and may receive a responsive user utterance that confirms or refutes the recommendation. User input data corresponding to the responsive user utterance may be utilized to determine that the recommended naming indicator is or is not to be associated with the device 102, 104. In examples where the recommendation is sent to a user device that includes a display, the user device may display the recommendation and receive user input, such as in the form of touch input. In examples where the recommended naming indicator is to be associated with the device 102, 104, a setup speechlet 144 may be configured to generate data indicating the association between the naming indicator and the device 102, 104, and that data may be stored in association with the user registry 130 for use by the remote system 106 in performing operations associated with the device 102, 104.

Figure 3:
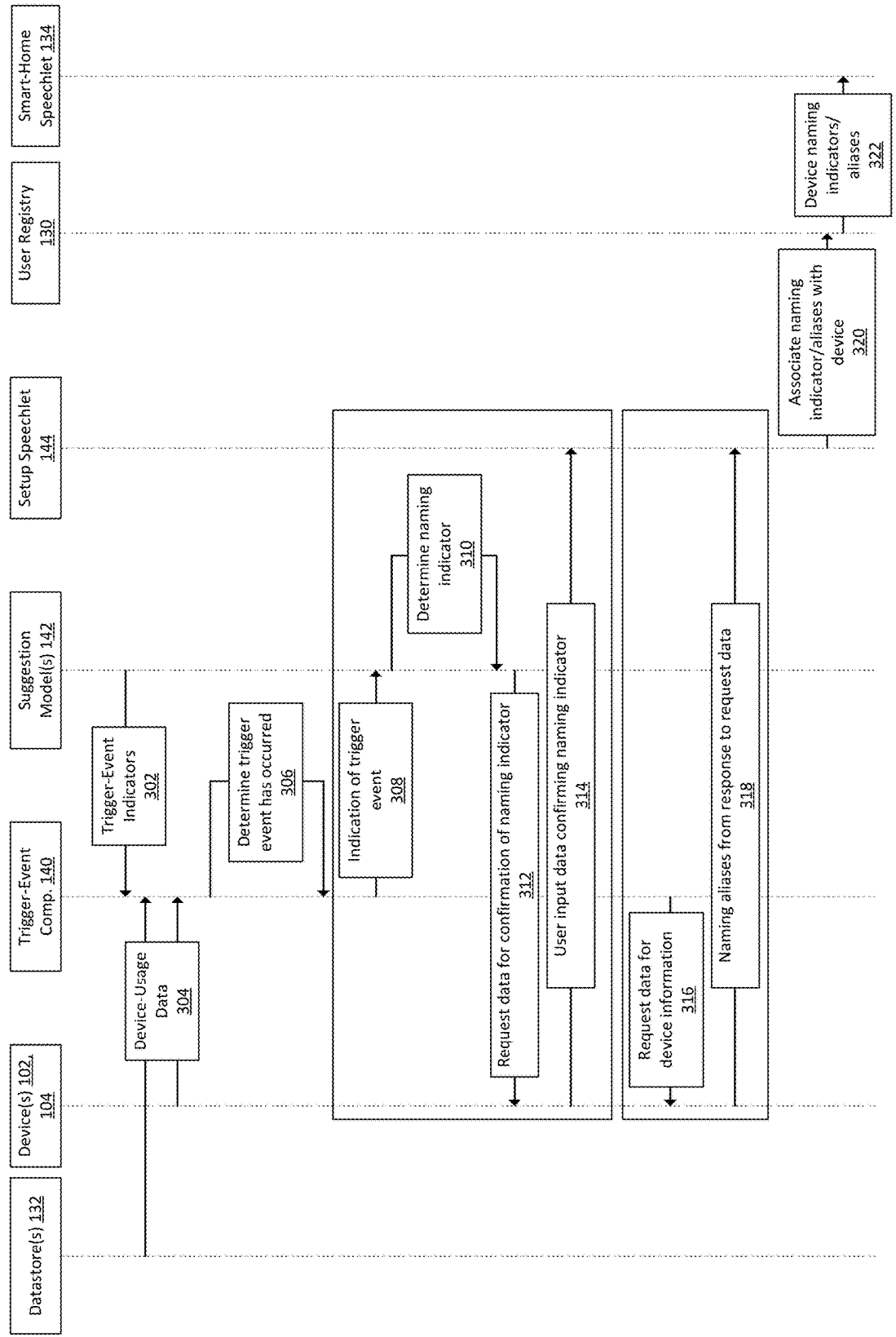
FIG. 3 illustrates a sequence diagram of example processes for usage-based device naming and grouping.

FIG. 3 illustrates a sequence diagram of example processes for usage-based device naming and grouping. While the sequence diagram depicts the performance of operations and/or the transmission of certain data in a sequential manner, the operations may be performed in a different order than the order depicted in FIG. 3 and/or at least a portion of the operations may be performed in parallel.

At block 302, one or more trigger-event indicators may be sent from the suggestion models 142 to the trigger-event component 140. For example, the suggestion models 142 may be configured to determine trigger events such as, but not limited to, when prior usage recommendations, which may be described as hunches, have been ignored and/or declined and/or have been determined multiple times, such as more than a threshold number of times. In these examples, the usage recommendations may indicate that the device 102, 104 in question has a usage pattern that is inconsistent with its current naming indicator and/or device group affiliation. The usage recommendations described herein may include, for example, recommending that a "light" connected device 104 be turned off at a given time and/or on a given day based at least in part on historical usage data associated with that connected device 104 and/or other connected devices having the same device type or otherwise having an association with the connected device 104.

The trigger events may also include receiving audio data representing a user request to operate the device 102, 104 but utilizing a device identifier that is not a currently-assigned naming indicator and/or is not synonymous with the currently-assigned naming indicator. In these examples, the audio data may indicate that the device identifier being uttered by a user indicates a different naming indicator that is to be associated with the device in question. For example, the naming indicator of a given connected device 104 may be "living room light." However, a user may call the connected device 104 something other than the "living room light" when requesting operation of the device. In these examples, the user may call the connected device 104 by a naming indicator that is not synonymous with "living room," such as the "couch light." The suggestions models 142 and/or one or more other components of the remote system 106 may determine that a trigger event has occurred when usage data indicates that "couch light" and "living room light" may be associated with the same device. For example, operation of the connected device 104 by a given voice-enabled device 102 may occur more frequently when the utterance includes "couch light" than with any other voice-enabled devices 102, and/or the device in question may be the only "light" type connected device 104 associated with the voice-enabled device 102.

The trigger events may also include an indication that a usage pattern associated with a given device 102, 104 has changed from a historical usage pattern of the device 102, 104. For example, a device may have a naming indicator of "Christmas Light" and may be operated in the same or a similar fashion during a given period of time. Thereafter, the usage pattern of the device 102, 104 may change, such as by a threshold degree, which may represent a trigger event and may indicate that the naming indicator of the device 102, 104 is to be changed. In still other examples, the trigger event may be based at least in part on the initial and/or current naming indicator associated with a device 102, 104 and the usage data. For example, certain naming indicators may include words that indicate that the device 102, 104 will be temporarily used for a given purpose but will be used for a different purpose at a later time. These devices 102, 104 may be more readily identified as devices 102, 104 for recommending renaming and/or regrouping. Additional trigger events may include device-usage patterns in a given season or otherwise predefined period of time and a corresponding usage change.

Additionally, or alternatively, the trigger events may include determining that a given usage pattern associated with a device 102, 104 is the same or similar to one or more reference usage patterns associated with one or more other devices 102, 104 and/or devices 102, 104 having the same or a similar device type to the device 102, 104 in question. In these examples, the system 106 may determine, based at least in part on the similar usage pattern, that the device 102, 104 in question is likely similar to the other devices 102, 104, and the naming indicators of the other devices 102, 104 may be utilized to recommend a naming indicator for the device 102, 104 in question. It should be understood that while several example trigger events are described herein, this disclosure includes the use of any device-usage data to determine when renaming and/or grouping recommendations is to be presented. It should also be understood that the suggestion models 142, particularly when those models include machine learning models, receive usage data and/or feedback data associated with the renaming recommendations, those suggestion models 142 may determine or otherwise "learn" one or more additional trigger events that indicate when a renaming recommendation is to be presented.

At block 304, the one or more datastores 132, and/or the user registry 130, and/or one or more electronic devices such as a voice-enabled device 102 and/or a connected device 104 may send device-usage data to the trigger-event component 140. For example, users may interact with the devices 102, 104, and data representing those interactions may be stored in association with the user registry 130 and/or the datastores 132. For example, a user may provide a command, such as a user utterance, to a voice-enabled device 102. The voice-enabled device 102 may generate audio data representing the user utterance and may send the audio data to the remote system for processing. An NLU component may determine intent data associated with the audio data and may determine one or more speechlets, such as the smart-home speechlet, or otherwise applications designated as being capable of handling the intent data, to send the intent data to. In instances where the user utterance represents a request to operate a smart-home connected device 104, the smart-home speechlet may be called to service the intent data. The smart-home speechlet may send a request to an internet-of-things component to determine which connected device 104 associated with the voice-enabled device 102 is to be acted upon. The internet-of-things component may provide information about the connected devices 104 associated with the voice-enabled device 102, and the remote system 106 may utilize this information to generate a command for operating the connected device 104 as requested by the user. Some or all of this device-usage data may be stored in association with the user registry 130 and/or the datastores 132, and may be sent to the trigger-event component 140 for detecting a trigger event.

Additional device-usage data may include, for example, user requests to operate devices utilizing a device identifier that is not a currently-assigned naming indicator and/or is not synonymous with the currently-assigned naming indicator. The device-usage data may also include operations performed by a device, such as over a period of time, whether based on voice commands or by commands other than voice. In examples, the device-usage data may be provided by the various devices being utilized and/or by system associated with those devices. Examples of information sent by such devices and/or systems includes when a state change occurs, when a request is received to perform an operation in association with the devices, when an event occurs with respect to the devices, such as when a user interacts with the devices, when an environmental change is detected by the devices, such as detection of motion, ambient light changes, etc., and/or other information that the devices and/or the systems generate that is associated with use of the devices. This information may be stored in the datastores 132 as described herein. The suggestion models 142 may be trained utilizing this data and/or other data associated with the device usage, such as user account identifiers, user identifiers, device identifiers, device type indications, timing data, etc. This information may be utilized by the suggestion models 142 to determine a historical or otherwise typical usage pattern, which may be compared to a sample usage of a device to determine if the sample usage deviates from the historical usage pattern, such as to a threshold degree. This may indicate that the naming indicator is to be changed as described herein.

At block 306, the trigger-event component 140 may determine that at least one trigger event has occurred. For example, the suggestion models 142 may provide data indicating the trigger event to the trigger-event component 140, which may be configured to analyze the usage data to determine when the one or more trigger events occur. In examples, determining whether a trigger event has occurred may be based at least in part on whether the usage data indicates that a usage pattern of the device corresponds to a given trigger event, such as to a given confidence level. The confidence levels may be based at least in part on how similar a given usage pattern corresponds to reference usage patterns associated with reference usage data and/or with the trigger events. Confidence level thresholds may be determined and may be utilized to determine whether a given confidence level associated with a usage pattern satisfies a given confidence level threshold.

At block 308, the trigger-event component 140 may send an indication of the trigger event to one or more suggestion models 142. For example, the trigger-event component 140 may generate data indicating that a trigger event has occurred. The data may also indicate which of the trigger events has occurred and/or the confidence level associated with the trigger event. The trigger-event component 140 may also send the usage data to the suggestion models 142.

At block 310, the suggestion models 142 may determine a naming indicator to recommend for association with a given device 102, 104. For example, one or more naming indicators may be predetermined based at least in part on the specific trigger event that has occurred and/or based at least in part on the device 102, 104 at issue and/or based at least in part on the usage data utilized to determine that the trigger event has occurred. For example, when the trigger event indicates that a usage pattern associated with a device 102, 104 corresponds to a given hunch, the hunch may indicate what the recommended naming indicator should be. In other examples, such as where the trigger event indicates a deviated usage pattern from a typical usage pattern for the device, the usage data indicating the deviated usage pattern may be utilized to determine the recommended naming indicator. It should be understood that while examples of how the suggestion models 142 may determine the recommended naming indicator, other ways of determining the naming indicator are also disclosed herein, such as, for example, utilizing global and/or aggregated usage data, utilizing data associated with a given user account, utilizing data associated with a description of the device at issue, utilizing data associated with other devices in the environment, utilizing user input data, etc.

At block 312, the suggestion models 142 may send request data to a device 102, 104 for confirmation of the recommended naming indicator. For example, once the recommended naming indicator is determined, a command may be generated and sent to the device 102, 104 and/or another user device that may cause the device 102, 104 and/or the user device to output the recommendation. In instances where the command is sent to a voice-enabled device 102, the command may cause audio representing the recommendation to be output by speakers of the voice-enabled device 102. In instances where the command is sent to a user device, such as a device with a display, the command may cause display of text representing the recommendation.

At block 314, the device 102, 104 may send user input data confirming naming indicator to the setup speechlet 144. For example, the user input data may include audio data representing a user utterance response to the recommendation. In other examples, the user input data may correspond to user input received via the user device.

Alternatively, or in addition to the operations 308-314 described above, at block 316 the trigger-event component 140 may send request data to the device 102, 104 for device information. For example, a notification component may query a notification speechlet to send a command to a voice-enabled device 102 to output audio requesting the additional information from the user. In examples, the notification component may be configured to determine when to query the notification speechlet, such as when audio data representing a user utterance is received, when a wake word is detected, etc. The notification speechlet may, when directed by the notification component, send the command to the voice-enabled device 102, which may output audio requesting the additional information about the device 102, 104. For example, the audio may include an indication that the trigger event has been detected and/or a request for the additional information. The user may, in response to the audio output by the voice-enabled device 102, speak a user utterance and microphones of the voice-enabled device 102 may generate corresponding audio data. The ASR component may receive the audio data and may utilize the audio data to generate text data representing the user utterance. The NLU component may be configured to utilize the text data to determine one or more words that may correspond to the naming indicator for the device 102, 104 and/or the naming aliases to associate with the device 102, 104. For example, words identified as adjectives and/or other descriptors of the device 102, 104 may be tagged and utilized for determining the naming indicators and/or naming aliases. The data may be provided to the suggestion models, which may utilize this data to generate a suggested naming indicator and/or to generate a suggested device grouping for the device 102, 104 in questions.

At block 318, the device 102, 104 may send data indicating naming aliases to the setup speechlet 144. The naming aliases may correspond to additional ways of identifying a given device 102, 104 and may be utilized during device inference operations, particularly when a given user command does not explicitly include the naming indicator for the device 102, 104.

At block 320, the setup speechlet 144 may generate data associating the naming indicators and/or the naming aliases with the device 102, 104. This data may be stored in association with user account data in the user registry 130. This data may be utilized by the remote system and/or other devices and/or components for identifying a device 102, 104 and/or for performing other operations associated with the device 102, 104. In examples, the naming aliases described herein may be utilized for device targeting. For example, a user utterance may include a device naming indicator that does not correspond to a naming indicator associated with the user account data. In these examples, the aliases may be utilized to determine which of the devices associated with the user account data is the most likely device to target for performing an operation based on the user utterance.

At block 322, the user registry 130 may provide the device naming indicators and/or aliases for devices associated with a given user account. For example, when audio data is received from a device, that audio data may be analyzed to determine an intent associated with the user utterance corresponding to the audio data. When the intent is associated with operating one or more electronic devices, such as a smart-home device, the smart-home speechlet 134 may be called to determine a response to the user utterance and/or to perform an operation. To determine what device to act upon, the smart-home speechlet 134 may query the user registry 130 for the device naming indicators/aliases and may determine a device to act upon based at least in part on the naming indicators/aliases.

FIGS. 4-7 illustrate processes for usage-based device naming and grouping. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3 and 8-10, although the processes may be implemented in a wide variety of other environments, architectures and systems.

Figure 4:
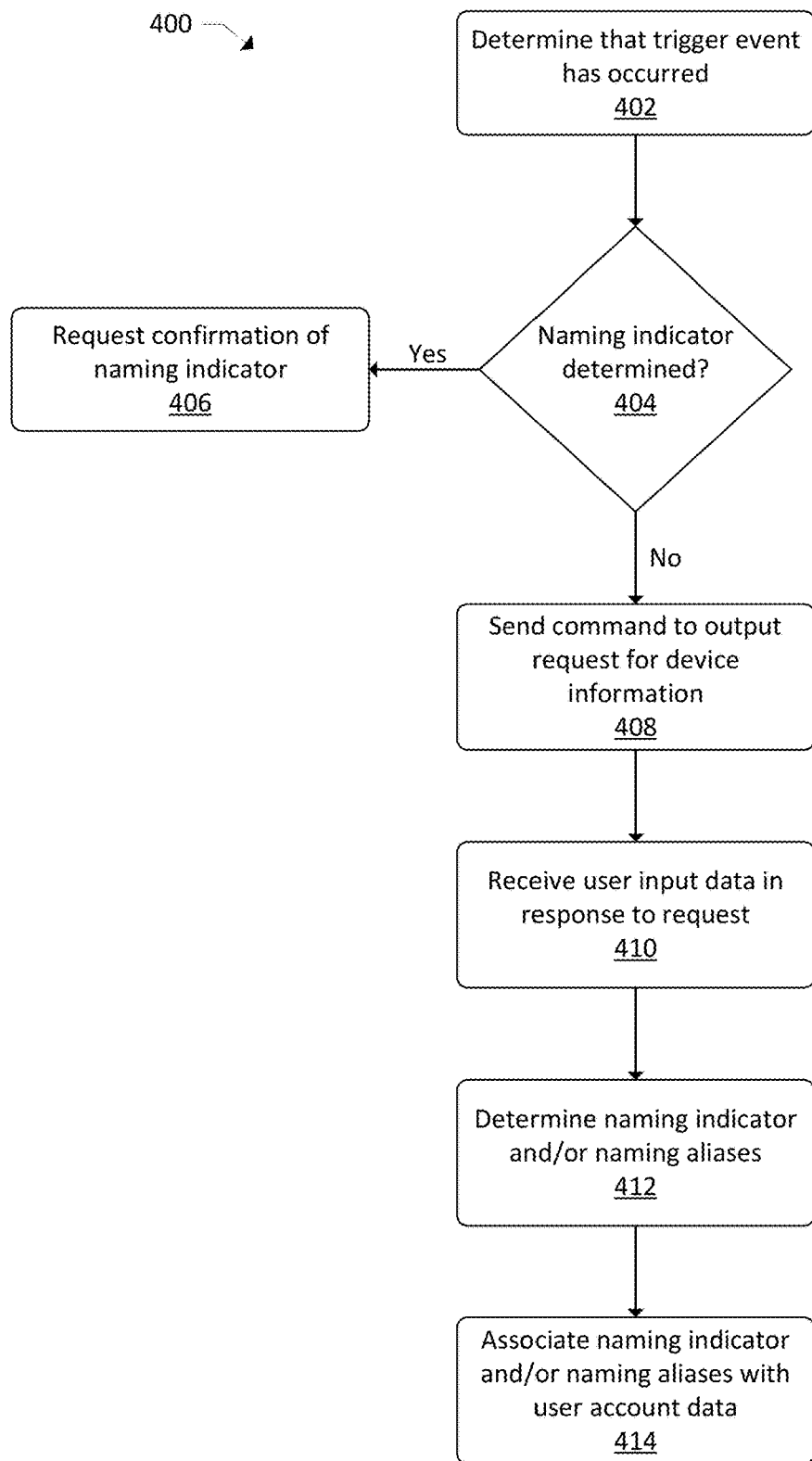
FIG. 4 illustrates a flow diagram of an example process for usage-based device naming utilizing natural language understanding techniques.

FIG. 4 illustrates a flow diagram of an example process 400 for usage-based device naming and grouping utilizing natural language understanding techniques. The order in which the operations or steps are described is not intended to be construed as a limitation, and any number of the described operations may be combined in any order and/or in parallel to implement process 400.

At block 402, the process 400 may include determining that a trigger event has occurred. For example, suggestion models may provide data indicating one or more trigger events to the trigger-event component, which may be configured to analyze the usage data to determine when the one or more trigger events occur. In examples, determining whether a trigger event has occurred may be based at least in part on whether the usage data indicates that a usage pattern of the device corresponds to a given trigger event, such as to a given confidence level. The confidence levels may be based at least in part on how similar a given usage pattern corresponds to reference usage patterns associated with reference usage data and/or with the trigger events. Confidence level thresholds may be determined and may be utilized to determine whether a given confidence level associated with a usage pattern satisfies a given confidence level threshold.

The suggestion models may be configured to determine trigger events such as, but not limited to, when prior usage recommendations, which may be described as hunches, have been ignored and/or declined and/or have been determined multiple times, such as more than a threshold number of times. In these examples, the usage recommendations may indicate that the device in question has a usage pattern that is inconsistent with its current naming indicator and/or device group affiliation. The usage recommendations described herein may include, for example, recommending that a "light" connected device be turned off at a given time and/or on a given day based at least in part on historical usage data associated with that connected device and/or other connected devices having the same device type or otherwise having an association with the connected device.

The trigger events may also include receiving audio data representing a user request to operate the device but utilizing a device identifier that is not a currently-assigned naming indicator and/or is not synonymous with the currently-assigned naming indicator. In these examples, the audio data may indicate that the device identifier being uttered by a user indicates a different naming indicator that is to be associated with the device in question. For example, the naming indicator of a given connected device may be "living room light." However, a user may call the connected device something other than the "living room light" when requesting operation of the device. In these examples, the user may call the connected device by a naming indicator that is not synonymous with "living room," such as the "couch light." The suggestions models and/or one or more other components of the remote system may determine that a trigger event has occurred when usage data indicates that "couch light" and "living room light" may be associated with the same device. For example, operation of the connected device by a given voice-enabled device may occur more frequently when the utterance includes "couch light" than with any other voice-enabled devices, and/or the device in question may be the only "light" type connected device associated with the voice-enabled device.

The trigger events may also include an indication that a usage pattern associated with a given device has changed from a historical usage pattern of the device. For example, a device may have a naming indicator of "Christmas Light" and may be operated in the same or a similar fashion during a given period of time. Thereafter, the usage pattern of the device may change, such as by a threshold degree, which may represent a trigger event and may indicate that the naming indicator of the device is to be changed. In still other examples, the trigger event may be based at least in part on the initial and/or current naming indicator associated with a device and the usage data. For example, certain naming indicators may include words that indicate that the device will be temporarily used for a given purpose but will be used for a different purpose at a later time. These devices may be more readily identified as devices for recommending renaming and/or regrouping. Additional trigger events may include device-usage patterns in a given season or otherwise predefined period of time and a corresponding usage change.

Additionally, or alternatively, the trigger events may include determining that a given usage pattern associated with a device is the same or similar to one or more reference usage patterns associated with one or more other devices and/or devices having the same or a similar device type to the device in question. In these examples, the system may determine, based at least in part on the similar usage pattern, that the device in question is likely similar to the other devices, and the naming indicators of the other devices may be utilized to recommend a naming indicator for the device in question. It should be understood that while several example trigger events are described herein, this disclosure includes the use of any device-usage data to determine when renaming and/or grouping recommendations is to be presented. It should also be understood that the suggestion models, particularly when those models include machine learning models, receive usage data and/or feedback data associated with the renaming recommendations, those suggestion models may determine or otherwise "learn" one or more additional trigger events that indicate when a renaming recommendation is to be presented.

At block 404, the process 400 may include determining whether a naming indicator has been determined by a component of the remote system. For example, one or more naming indicators may be predetermined based at least in part on the specific trigger event that has occurred and/or based at least in part on the device at issue and/or based at least in part on the usage data utilized to determine that the trigger event has occurred. For example, when the trigger event indicates that a usage pattern associated with a device corresponds to a given hunch, the hunch may indicate what the recommended naming indicator should be. In other examples, such as where the trigger event indicates a deviated usage pattern from a typical usage pattern for the device, the usage data indicating the deviated usage pattern may be utilized to determine the recommended naming indicator. It should be understood that while examples of how the suggestion models may determine the recommended naming indicator, other ways of determining the naming indicator are also disclosed herein, such as, for example, utilizing global and/or aggregated usage data, utilizing data associated with a given user account, utilizing data associated with a description of the device at issue, utilizing data associated with other devices in the environment, utilizing user input data, etc.

In examples where the naming indicator has been determined, the process 400, at block 406, may include requesting confirmation of the naming indicator. For example, once the recommended naming indicator is determined, a command may be generated and sent to the device and/or another user device that may cause the device and/or the user device to output the recommendation. In instances where the command is sent to a voice-enabled device, the command may cause audio representing the recommendation to be output by speakers of the voice-enabled device. In instances where the command is sent to a user device, such as a device with a display, the command may cause display of text representing the recommendation. The device may send user input data confirming naming indicator to a setup speechlet. For example, the user input data may include audio data representing a user utterance response to the recommendation. In other examples, the user input data may correspond to user input received via the user device.

In examples where the naming indicator has not been determined, the process 400, at block 408, may include sending a command to output the request for device information to a voice-enabled device and/or a user device. For example, a notification component may query a notification speechlet to send a command to a voice-enabled device to output audio requesting the additional information from the user. In examples, the notification component may be configured to determine when to query the notification speechlet, such as when audio data representing a user utterance is received, when a wake word is detected, etc. The notification speechlet may, when directed by the notification component, send the command to the voice-enabled device, which may output audio requesting the additional information about the device. For example, the audio may include an indication that the trigger event has been detected and/or a request for the additional information.

At block 410, the process 400 may include receiving user input data in response to the request for device information. For example, the user may, in response to the audio output by the voice-enabled device, speak a user utterance and microphones of the voice-enabled device may generate corresponding audio data. The ASR component may receive the audio data and may utilize the audio data to generate text data representing the user utterance. The NLU component may be configured to utilize the text data to determine one or more words that may correspond to the naming indicator for the device and/or the naming aliases to associate with the device.

At block 412, the process 400 may include determining a naming indicator and/or naming aliases from the device information. For example, words identified as adjectives and/or other descriptors of the device may be tagged and utilized for determining the naming indicators and/or naming aliases. The data may be provided to the suggestion models, which may utilize this data to generate a suggested naming indicator and/or to generate a suggested device grouping for the device in question.

At block 414, the process 400 may include associating the naming indicator and/or the naming aliases with the user account data and/or the device. For example, data indicating the naming indicator and/or naming aliases may be stored in association with user account data in the user registry. This data may be utilized by the remote system and/or other devices and/or components for identifying a device and/or for performing other operations associated with the device.

Figure 5:
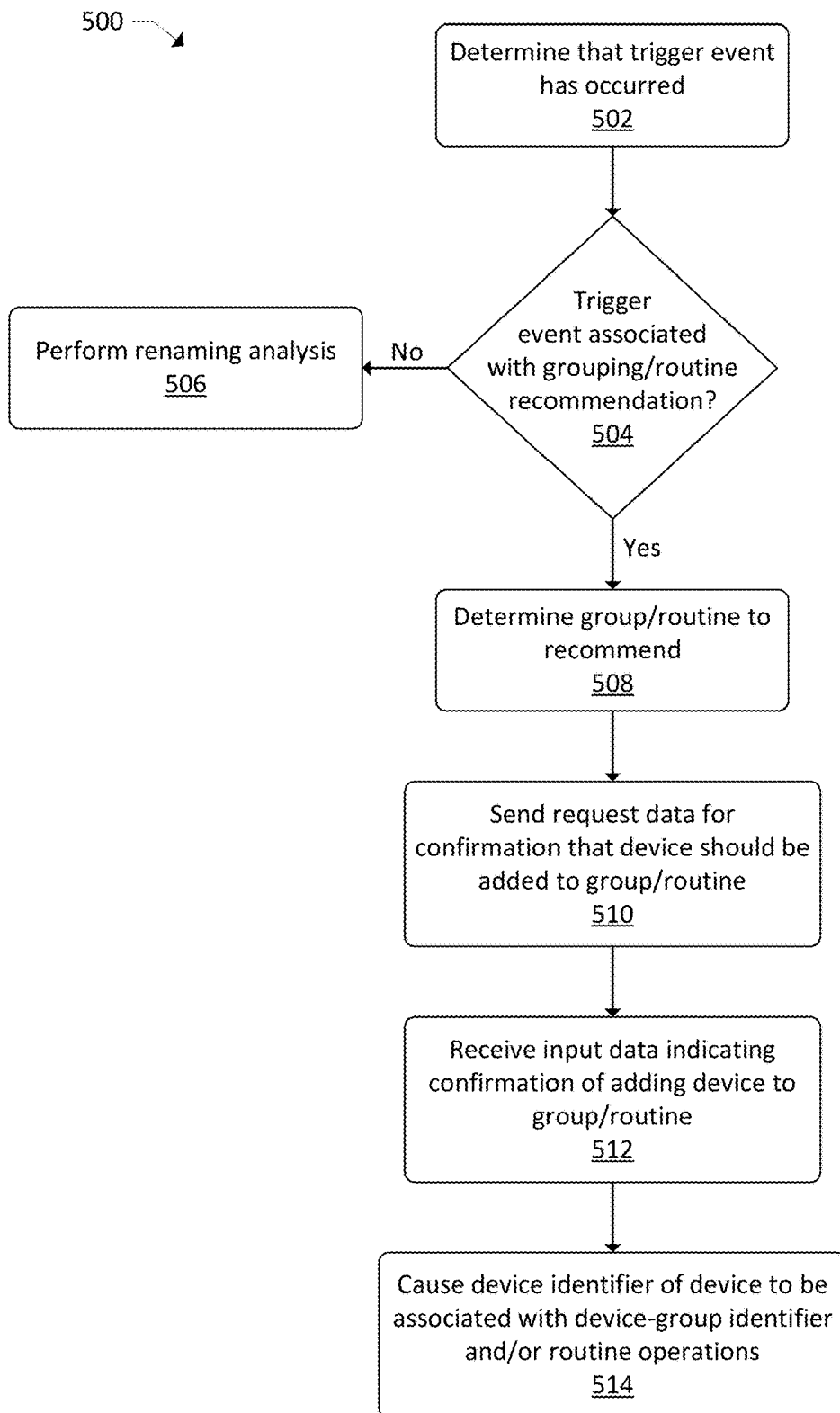
FIG. 5 illustrates a flow diagram of an example process for usage-based device grouping.

FIG. 5 illustrates a flow diagram of an example process 500 for usage-based device grouping. The order in which the operations or steps are described is not intended to be construed as a limitation, and any number of the described operations may be combined in any order and/or in parallel to implement process 500.

At block 502, the process 500 may include determining that a trigger event has occurred. For example, suggestion models may provide data indicating one or more trigger events to the trigger-event component, which may be configured to analyze the usage data to determine when the one or more trigger events occur. In examples, determining whether a trigger event has occurred may be based at least in part on whether the usage data indicates that a usage pattern of the device corresponds to a given trigger event, such as to a given confidence level. The confidence levels may be based at least in part on how similar a given usage pattern corresponds to reference usage patterns associated with reference usage data and/or with the trigger events. Confidence level thresholds may be determined and may be utilized to determine whether a given confidence level associated with a usage pattern satisfies a given confidence level threshold.

The suggestion models may be configured to determine trigger events such as, but not limited to, when prior usage recommendations, which may be described as hunches, have been ignored and/or declined and/or have been determined multiple times, such as more than a threshold number of times. In these examples, the usage recommendations may indicate that the device in question has a usage pattern that is inconsistent with its current naming indicator and/or device group affiliation. The usage recommendations described herein may include, for example, recommending that a "light" connected device be turned off at a given time and/or on a given day based at least in part on historical usage data associated with that connected device and/or other connected devices having the same device type or otherwise having an association with the connected device.

The trigger events may also include receiving audio data representing a user request to operate the device but utilizing a device identifier that is not a currently-assigned naming indicator and/or is not synonymous with the currently-assigned naming indicator. In these examples, the audio data may indicate that the device identifier being uttered by a user indicates a different naming indicator that is to be associated with the device in question. For example, the naming indicator of a given connected device may be "living room light." However, a user may call the connected device something other than the "living room light" when requesting operation of the device. In these examples, the user may call the connected device by a naming indicator that is not synonymous with "living room," such as the "couch light." The suggestions models and/or one or more other components of the remote system may determine that a trigger event has occurred when usage data indicates that "couch light" and "living room light" may be associated with the same device. For example, operation of the connected device by a given voice-enabled device may occur more frequently when the utterance includes "couch light" than with any other voice-enabled devices, and/or the device in question may be the only "light" type connected device associated with the voice-enabled device.

The trigger events may also include an indication that a usage pattern associated with a given device has changed from a historical usage pattern of the device. For example, a device may have a naming indicator of "Christmas Light" and may be operated in the same or a similar fashion during a given period of time. Thereafter, the usage pattern of the device may change, such as by a threshold degree, which may represent a trigger event and may indicate that the naming indicator of the device is to be changed. In still other examples, the trigger event may be based at least in part on the initial and/or current naming indicator associated with a device and the usage data. For example, certain naming indicators may include words that indicate that the device will be temporarily used for a given purpose but will be used for a different purpose at a later time. These devices may be more readily identified as devices for recommending renaming and/or regrouping. Additional trigger events may include device-usage patterns in a given season or otherwise predefined period of time and a corresponding usage change.

Additionally, or alternatively, the trigger events may include determining that a given usage pattern associated with a device is the same or similar to one or more other reference usage patterns associated with one or more other devices and/or devices having the same or a similar device type to the device in question. In these examples, the system may determine, based at least in part on the similar usage pattern, that the device in question is likely similar to the other devices, and the naming indicators of the other devices may be utilized to recommend a naming indicator for the device in question. It should be understood that while several example trigger events are described herein, this disclosure includes the use of any device-usage data to determine when renaming and/or grouping recommendations is to be presented. It should also be understood that the suggestion models, particularly when those models include machine learning models, receive usage data and/or feedback data associated with the renaming recommendations, those suggestion models may determine or otherwise "learn" one or more additional trigger events that indicate when a renaming recommendation is to be presented.

At block 504, the process 500 may include determining whether the trigger event is associated with a grouping and/or routine recommendation. For example, certain trigger events may be predetermined to be associated with a grouping and/or routine recommendation. For example, when usage data indicates a change in a usage pattern that is similar to a usage pattern of another device in a given device group, the trigger event of the change in usage pattern may be associated with a recommendation to add the device in question to the device group based at least in part on the similar usage pattern with at least one device in that device group.

In examples where the trigger event is not associated with a grouping and/or routine recommendation, the process 500, at block 506, may include performing a renaming analysis, which may be the same or similar to the process 400 described with respect to FIG. 4.

In examples where the trigger event is associated with a grouping and/or routine recommendation, the process 500, at block 508, may include determining the grouping recommendation and/or the routine recommendation. For example, the suggestion models described herein may be configured to intake an indication of the trigger event and/or the usage data, for example, to determine which group and/or routine to recommend adding the device in question to. It should be understood that while the example recommendation of adding a device to a device group is used here, the grouping and/or routine recommendation may be a recommendation to remove a device from a group and/or routine, to modify a routine, to modify a group, and/or to perform other actions associated with a device group and/or a routine.

In examples, generating recommendations, such as recommendations associated with device groupings and/or routines may include identifying components of a given recommendation and determining those components, such as based at least in part on data stored in association with the user registry, usage history data, and/or based at least in part on the trigger events as described herein. For example, the components may include whether a recommendation is to be associated with creating a group identifier, adding a device identifier to a device group, removing a device identifier from a device group, removing a group identifier from user account data, and/or renaming a device within a group, for example. These determinations may be based at least in part on the given group in question, the device members of the group, one or more confidence values associated with the recommendation and/or the similarity determination between a given usage pattern and reference usage patterns of devices associated with the group, and/or a cost value associated with the recommendation. The cost value may be based at least in part on a number of free parameters associated with the recommendation and/or group, a number of prompts to be provided to the user, etc. The number of free parameters may include the number of unknown factors. For example, when the group and the member identifiers are unknown, then the number of unknown factors may be considered 2, and may indicate that a recommendation should not be presented.

This information may also be utilized for recommendation arbitration. For example, the trigger events and/or usage patterns described herein may indicate that more than one recommendation may be presented. In these examples, the recommendations may be associated with a confidence value indicating a likelihood that the recommendation is accurate and/or that the recommendation will be accepted. In examples where multiple recommendations are determined, the recommendation with the most favorable confidence value may be selected for surfacing.

At block 510, the process 500 may include sending request data for confirmation that the device in question is to be added to the group and/or routine in question. For example, once the recommended group and/or routine is determined, a command may be generated and sent to the device and/or another user device that may cause the device and/or the user device to output the recommendation. In instances where the command is sent to a voice-enabled device, the command may cause audio representing the recommendation to be output by speakers of the voice-enabled device. In instances where the command is sent to a user device, such as a device with a display, the command may cause display of text representing the recommendation.

At block 512, the process 500 may include receiving input data indicating confirmation of adding the device to the group and/or the routine. For example, the device may send user input data confirming the group and/or routine to a setup speechlet. For example, the user input data may include audio data representing a user utterance response to the recommendation. In other examples, the user input data may correspond to user input received via the user device.

At block 514, the process 500 may include causing a device identifier associated with the device to be associated with a device-group identifier of the device group and/or one or more routine operations associated with the routine. For example, data indicating the affiliation between the device and the device group and/or routine may be stored in association with user account data in the user registry. This data may be utilized by the remote system and/or other devices and/or components for operating devices associated with the device group and/or routine.

Figure 6:
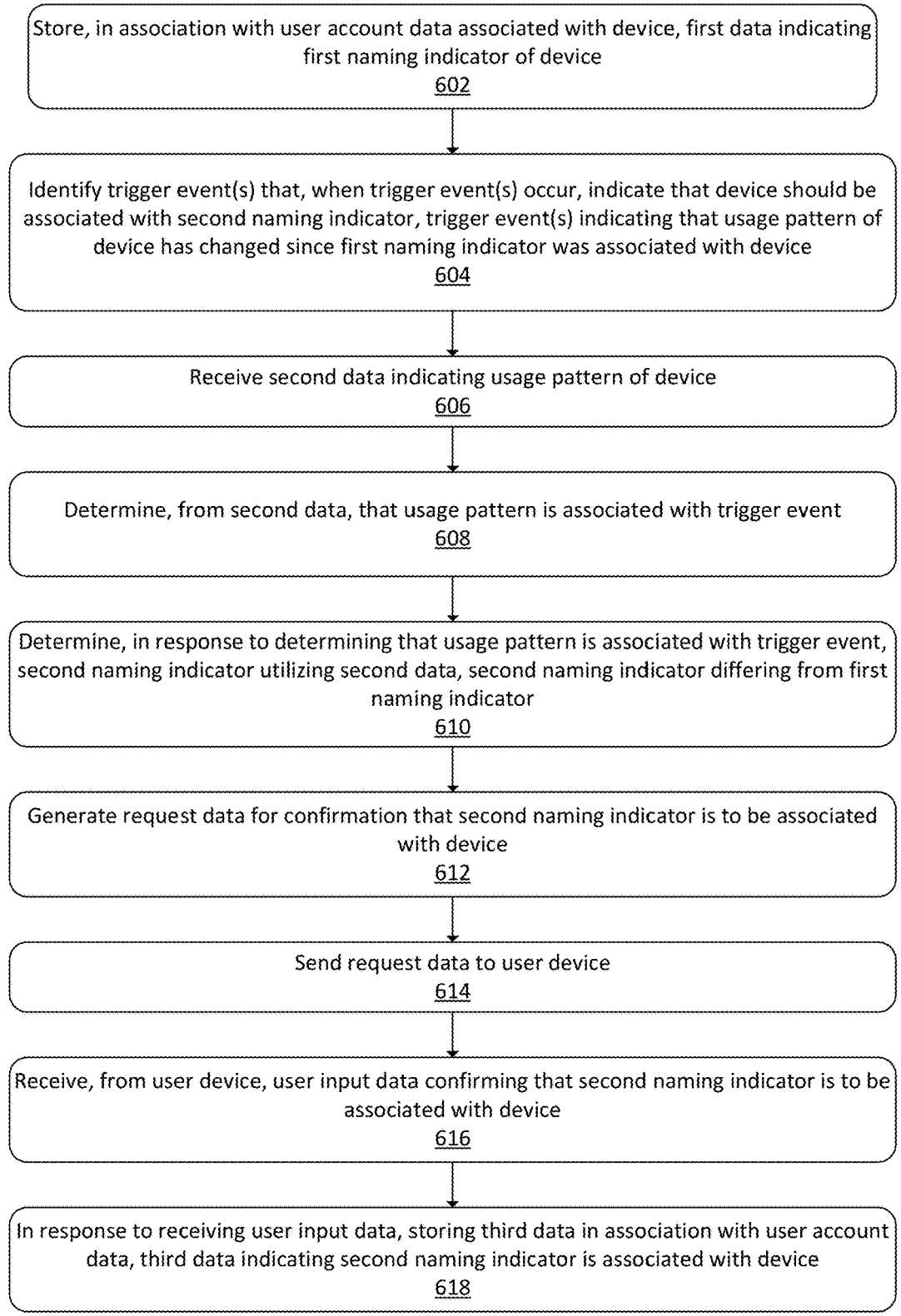
FIG. 6 illustrates a flow diagram of an example process for usage-based device naming and grouping.

FIG. 6 illustrates a flow diagram of an example process 600 for usage-based device naming and grouping. The order in which the operations or steps are described is not intended to be construed as a limitation, and any number of the described operations may be combined in any order and/or in parallel to implement process 600.

At block 602, the process 600 may include storing, in association with user account data associated with a device, first data indicating a first naming indicator of the device. For example, devices may be given naming indicators, such as by users, by a speech-processing system, by a manufacturer of the devices, and/or by one or more systems associated with the device. The naming indicator may be stored in association with a device identifier of the device in a user registry including user account data for the device and one or more other devices associated with the user account data.

At block 604, the process 600 may include identifying a trigger event that, when the trigger event occurs, indicates that the device is to be associated with a second naming indicator, the trigger event indicating that a usage pattern of the device has changed since the first naming indicator was associated with the device. For example, suggestion models may be configured to determine trigger events such as, but not limited to, when prior usage recommendations, which may be described as hunches, have been ignored and/or declined and/or have been determined multiple times, such as more than a threshold number of times. In these examples, the usage recommendations may indicate that the device in question has a usage pattern that is inconsistent with its current naming indicator and/or device group affiliation. The usage recommendations described herein may include, for example, recommending that a "light" connected device be turned off at a given time and/or on a given day based at least in part on historical usage data associated with that connected device and/or other connected devices having the same device type or otherwise having an association with the connected device.

The trigger events may also include receiving audio data representing a user request to operate the device but utilizing a device identifier that is not a currently-assigned naming indicator and/or is not synonymous with the currently-assigned naming indicator. In these examples, the audio data may indicate that the device identifier being uttered by a user indicates a different naming indicator that is to be associated with the device in question. For example, the naming indicator of a given connected device may be "living room light." However, a user may call the connected device something other than the "living room light" when requesting operation of the device. In these examples, the user may call the connected device by a naming indicator that is not synonymous with "living room," such as the "couch light." The suggestions models and/or one or more other components of the remote system may determine that a trigger event has occurred when usage data indicates that "couch light" and "living room light" may be associated with the same device. For example, operation of the connected device by a given voice-enabled device may occur more frequently when the utterance includes "couch light" than with any other voice-enabled devices, and/or the device in question may be the only "light" type connected device associated with the voice-enabled device.

The trigger events may also include an indication that a usage pattern associated with a given device has changed from a historical usage pattern of the device. For example, a device may have a naming indicator of "Christmas Light" and may be operated in the same or a similar fashion during a given period of time. Thereafter, the usage pattern of the device may change, such as by a threshold degree, which may represent a trigger event and may indicate that the naming indicator of the device is to be changed. In still other examples, the trigger event may be based at least in part on the initial and/or current naming indicator associated with a device and the usage data. For example, certain naming indicators may include words that indicate that the device will be temporarily used for a given purpose but will be used for a different purpose at a later time. These devices may be more readily identified as devices for recommending renaming and/or regrouping. Additional trigger events may include device-usage patterns in a given season or otherwise predefined period of time and a corresponding usage change.

Additionally, or alternatively, the trigger events may include determining that a given usage pattern associated with a device is the same or similar to one or more reference usage patterns associated with one or more other devices and/or devices having the same or a similar device type to the device in question. In these examples, the system may determine, based at least in part on the similar usage pattern, that the device in question is likely similar to the other devices, and the naming indicators of the other devices may be utilized to recommend a naming indicator for the device in question. It should be understood that while several example trigger events are described herein, this disclosure includes the use of any device-usage data to determine when renaming and/or grouping recommendations is to be presented. It should also be understood that the suggestion models, particularly when those models include machine learning models, receive usage data and/or feedback data associated with the renaming recommendations, those suggestion models may determine or otherwise "learn" one or more additional trigger events that indicate when a renaming recommendation is to be presented.

At block 606, the process 600 may include receiving second data indicating the usage pattern of the device. For example, users may interact with the devices, and data representing those interactions may be stored in association with the user registry and/or the datastores. For example, a user may provide a command, such as a user utterance, to a voice-enabled device. The voice-enabled device may generate audio data representing the user utterance and may send the audio data to the remote system for processing. An NLU component may determine intent data associated with the audio data and may determine one or more speechlets, such as the smart-home speechlet, or otherwise applications designated as being capable of handling the intent data, to send the intent data to. In instances where the user utterance represents a request to operate a smart-home connected device, the smart-home speechlet may be called to service the intent data. The smart-home speechlet may send a request to an internet-of-things component to determine which connected device associated with the voice-enabled device is to be acted upon. The internet-of-things component may provide information about the connected devices associated with the voice-enabled device, and the remote system may utilize this information to generate a command for operating the connected device as requested by the user. Some or all of this device-usage data may be stored in association with the user registry and/or the datastores, and may be sent to the trigger-event component for detecting a trigger event.

At block 608, the process 600 may include determining, from the second data, that the usage pattern is associated with the trigger event. For example, the suggestion models may provide data indicating the trigger event to the trigger-event component, which may be configured to analyze the usage data to determine when the one or more trigger events occur. In examples, determining whether a trigger event has occurred may be based at least in part on whether the usage data indicates that a usage pattern of the device corresponds to a given trigger event, such as to a given confidence level. The confidence levels may be based at least in part on how similar a given usage pattern corresponds to reference usage patterns associated with reference usage data and/or with the trigger events. Confidence level thresholds may be determined and may be utilized to determine whether a given confidence level associated with a usage pattern satisfies a given confidence level threshold.

At block 610, the process 600 may include determining, in response to determining that the usage pattern is associated with the trigger event, the second naming indicator utilizing the second data, the second naming indicator differing from the first naming indicator. For example, one or more naming indicators may be predetermined based at least in part on the specific trigger event that has occurred and/or based at least in part on the device at issue and/or based at least in part on the usage data utilized to determine that the trigger event has occurred. For example, when the trigger event indicates that a usage pattern associated with a device corresponds to a given hunch, the hunch may indicate what the recommended naming indicator should be. In other examples, such as where the trigger event indicates a deviated usage pattern from a typical usage pattern for the device, the usage data indicating the deviated usage pattern may be utilized to determine the recommended naming indicator. It should be understood that while examples of how the suggestion models may determine the recommended naming indicator, other ways of determining the naming indicator are also disclosed herein, such as, for example, utilizing global and/or aggregated usage data, utilizing data associated with a given user account, utilizing data associated with a description of the device at issue, utilizing data associated with other devices in the environment, utilizing user input data, etc.

At block 612, the process 600 may include generating request data for confirmation that the second naming indicator is to be associated with the device. For example, once the recommended naming indicator is determined, a command may be generated that may cause the device and/or the user device to output the recommendation. In instances where the command is sent to a voice-enabled device, the command may cause audio representing the recommendation to be output by speakers of the voice-enabled device. In instances where the command is sent to a user device, such as a device with a display, the command may cause display of text representing the recommendation.

At block 614, the process 600 may include sending the request data to a user device. The request data may include the audio data and/or text data representing the recommendation along with, in examples, the command to present or otherwise output the recommendation.

At block 616, the process 600 may include receiving, from the user device, user input data confirming that the second naming indicator is to be associated with the device. For example, the user input data may include audio data representing a user utterance response to the recommendation. In other examples, the user input data may correspond to user input received via the user device.

At block 618, the process 600 may include in response to receiving the user input data, storing third data in association with the user account data, the third data indicating the second naming indicator is associated with the device. For example, a setup speechlet may generate data associating the naming indicators and/or the naming aliases with the device. This data may be stored in association with user account data in the user registry. This data may be utilized by the remote system and/or other devices and/or components for identifying a device and/or for performing other operations associated with the device.

Additionally, or alternatively, the process 600 may include storing fourth data representing a reference usage pattern for devices associated with the device type, the reference usage pattern representing typical usage of the devices associated with the device type, the fourth data indicating a reference naming indicator associated with the devices. The process 600 may also include determining that the second data indicates that the usage pattern meets a threshold degree of similarity to the reference usage pattern. In these examples, the trigger event may result from the usage pattern meeting the threshold degree of similarity to the reference usage pattern. Additionally, determining the second naming indicator may include determining the second naming indicator from the reference naming indicator.

Additionally, or alternatively, the process 600 may include receiving, from the user device, audio data representing a user utterance. The process 600 may also include determining, from the audio data, that the user utterance includes a request to operate a target device having the second naming indicator and a device type. The process 600 may also include determining, from the user account data, that the device is associated with the device type and one or more other devices associated with the user account data are associated with other device types. In these examples, the trigger event may result from determining that the device is associated with the device type and the one or more other devices associated with the user account data are associated with other device types. Additionally, determining the second naming indicator may include determining the second naming indicator from the audio data indicating the second naming indicator.

Additionally, or alternatively, the process 600 may include storing fourth data indicating a room naming indicator associated with devices having a reference usage pattern, the reference usage pattern representing typical usage of the devices associated with the room naming indicator. The process 600 may also include determining that the second data indicates that the usage pattern meets a threshold degree of similarity to the reference usage pattern. In these examples, the trigger event may result from the usage pattern meeting the threshold degree of similarity to the reference usage pattern. Additionally, determining the second naming indicator may comprise including the room naming indicator and the first naming indicator in the second naming indicator.

Figure 7:
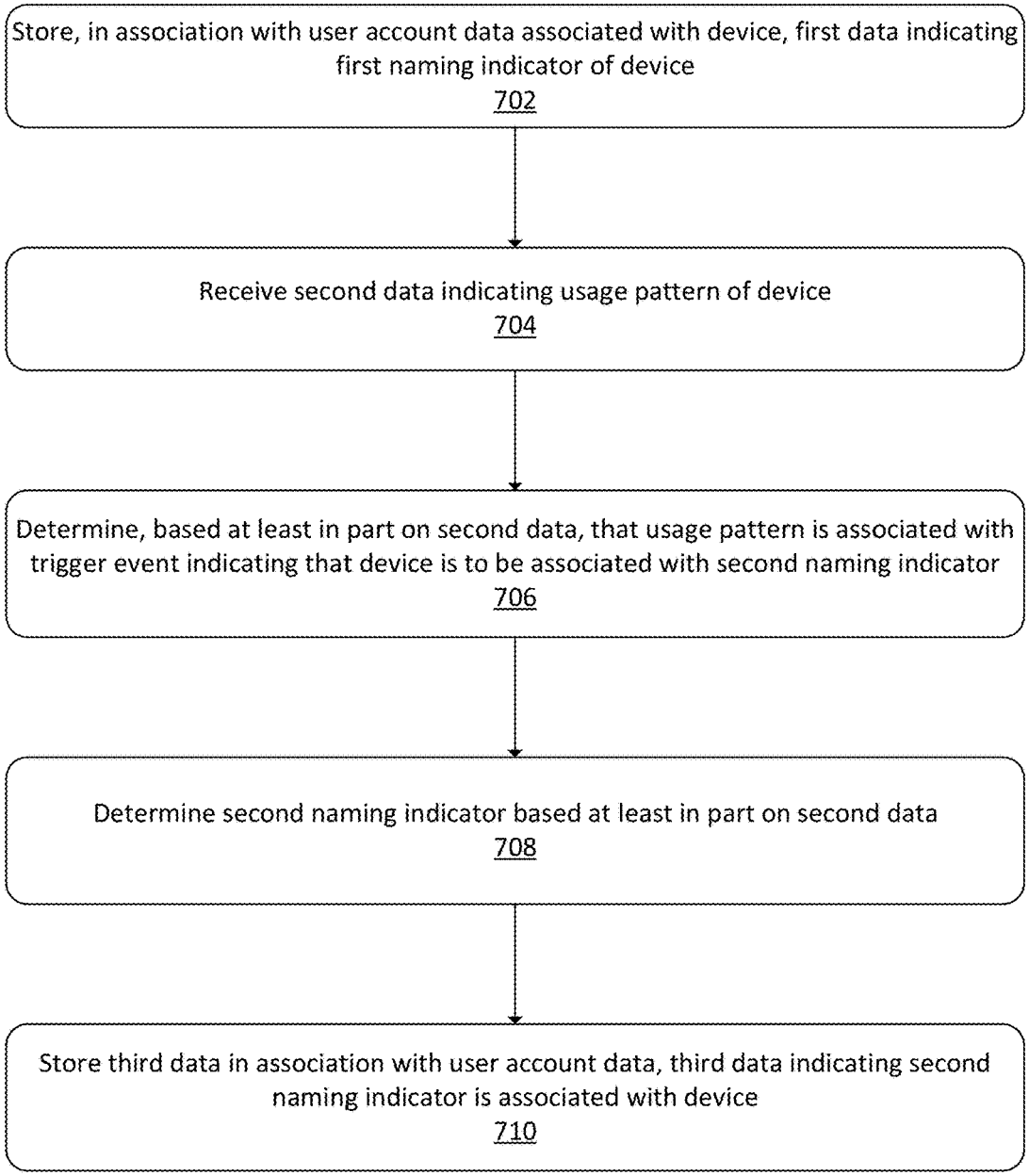
FIG. 7 illustrates a flow diagram of another example process for usage-based device naming and grouping.

FIG. 7 illustrates a flow diagram of another example process 700 for usage-based device naming and grouping. The order in which the operations or steps are described is not intended to be construed as a limitation, and any number of the described operations may be combined in any order and/or in parallel to implement process 700.

At block 702, the process 700 may include storing, in association with user account data associated with a device, first data indicating a first naming indicator of the device. For example, devices may be given naming indicators, such as by users, by a speech-processing system, by a manufacturer of the devices, and/or by one or more systems associated with the device. The naming indicator may be stored in association with a device identifier of the device in a user registry including user account data for the device and one or more other devices associated with the user account data. It should be understood that the first naming indicator may be a natural language name when the semantic meaning of the naming indicator represents or otherwise describes the device and/or a characteristic about the device and/or how the device is utilized.

At block 704, the process 700 may include receiving second data indicating a usage pattern of the device. For example, users may interact with the devices, and data representing those interactions may be stored in association with the user registry and/or the datastores. For example, a user may provide a command, such as a user utterance, to a voice-enabled device. The voice-enabled device may generate audio data representing the user utterance and may send the audio data to the remote system for processing. An NLU component may determine intent data associated with the audio data and may determine one or more speechlets, such as the smart-home speechlet, or otherwise applications designated as being capable of handling the intent data, to send the intent data to. In instances where the user utterance represents a request to operate a smart-home connected device, the smart-home speechlet may be called to service the intent data. The smart-home speechlet may send a request to an internet-of-things component to determine which connected device associated with the voice-enabled device is to be acted upon. The internet-of-things component may provide information about the connected devices associated with the voice-enabled device, and the remote system may utilize this information to generate a command for operating the connected device as requested by the user. Some or all of this device-usage data may be stored in association with the user registry and/or the datastores, and may be sent to the trigger-event component for detecting a trigger event.

At block 706, the process 700 may include determining, based at least in part on the second data, that the usage pattern is associated with a trigger event indicating that the device is to be associated with a second naming indicator. For example, the suggestion models may provide data indicating the trigger event to the trigger-event component, which may be configured to analyze the usage data to determine when the one or more trigger events occur. In examples, determining whether a trigger event has occurred may be based at least in part on whether the usage data indicates that a usage pattern of the device corresponds to a given trigger event, such as to a given confidence level. The confidence levels may be based at least in part on how similar a given usage pattern corresponds to reference usage patterns associated with reference usage data and/or with the trigger events. Confidence level thresholds may be determined and may be utilized to determine whether a given confidence level associated with a usage pattern satisfies a given confidence level threshold.

The trigger events may indicate when the device is to be associated with a second naming indicator based at least in part on a usage pattern of the device having changed since the first naming indicator was associated with the device. For example, suggestion models may be configured to determine trigger events such as, but not limited to, when prior usage recommendations, which may be described as hunches, have been ignored and/or declined and/or have been determined multiple times, such as more than a threshold number of times. In these examples, the usage recommendations may indicate that the device in question has a usage pattern that is inconsistent with its current naming indicator and/or device group affiliation. The usage recommendations described herein may include, for example, recommending that a "light" connected device be turned off at a given time and/or on a given day based at least in part on historical usage data associated with that connected device and/or other connected devices having the same device type or otherwise having an association with the connected device.

The trigger events may also include receiving audio data representing a user request to operate the device but utilizing a device identifier that is not a currently-assigned naming indicator and/or is not synonymous with the currently-assigned naming indicator. In these examples, the audio data may indicate that the device identifier being uttered by a user indicates a different naming indicator that is to be associated with the device in question. For example, the naming indicator of a given connected device may be "living room light." However, a user may call the connected device something other than the "living room light" when requesting operation of the device. In these examples, the user may call the connected device by a naming indicator that is not synonymous with "living room," such as the "couch light." The suggestions models and/or one or more other components of the remote system may determine that a trigger event has occurred when usage data indicates that "couch light" and "living room light" may be associated with the same device. For example, operation of the connected device by a given voice-enabled device may occur more frequently when the utterance includes "couch light" than with any other voice-enabled devices, and/or the device in question may be the only "light" type connected device associated with the voice-enabled device.

The trigger events may also include an indication that a usage pattern associated with a given device has changed from a historical usage pattern of the device. For example, a device may have a naming indicator of "Christmas Light" and may be operated in the same or a similar fashion during a given period of time. Thereafter, the usage pattern of the device may change, such as by a threshold degree, which may represent a trigger event and may indicate that the naming indicator of the device is to be changed. In still other examples, the trigger event may be based at least in part on the initial and/or current naming indicator associated with a device and the usage data. For example, certain naming indicators may include words that indicate that the device will be temporarily used for a given purpose but will be used for a different purpose at a later time. These devices may be more readily identified as devices for recommending renaming and/or regrouping. Additional trigger events may include device-usage patterns in a given season or otherwise predefined period of time and a corresponding usage change.

Additionally, or alternatively, the trigger events may include determining that a given usage pattern associated with a device is the same or similar to one or more reference usage patterns associated with one or more other devices and/or devices having the same or a similar device type to the device in question. In these examples, the system may determine, based at least in part on the similar usage pattern, that the device in question is likely similar to the other devices, and the naming indicators of the other devices may be utilized to recommend a naming indicator for the device in question. It should be understood that while several example trigger events are described herein, this disclosure includes the use of any device-usage data to determine when renaming and/or grouping recommendations is to be presented. It should also be understood that the suggestion models, particularly when those models include machine learning models, receive usage data and/or feedback data associated with the renaming recommendations, those suggestion models may determine or otherwise "learn" one or more additional trigger events that indicate when a renaming recommendation is to be presented.

At block 708, the process 700 may include determining the second naming indicator based at least in part on the second data. For example, one or more naming indicators may be predetermined based at least in part on the specific trigger event that has occurred and/or based at least in part on the device at issue and/or based at least in part on the usage data utilized to determine that the trigger event has occurred. For example, when the trigger event indicates that a usage pattern associated with a device corresponds to a given hunch, the hunch may indicate what the recommended naming indicator should be. In other examples, such as where the trigger event indicates a deviated usage pattern from a typical usage pattern for the device, the usage data indicating the deviated usage pattern may be utilized to determine the recommended naming indicator. It should be understood that while examples of how the suggestion models may determine the recommended naming indicator, other ways of determining the naming indicator are also disclosed herein, such as, for example, utilizing global and/or aggregated usage data, utilizing data associated with a given user account, utilizing data associated with a description of the device at issue, utilizing data associated with other devices in the environment, utilizing user input data, etc.

At block 710, the process 700 may include storing third data in association with the user account data, the third data indicating the second naming indicator is associated with the device. For example, a setup speechlet may generate data associating the naming indicators and/or the naming aliases with the device. This data may be stored in association with user account data in the user registry. This data may be utilized by the remote system and/or other devices and/or components for identifying a device and/or for performing other operations associated with the device.

Additionally, or alternatively, the process 700 may include storing fourth data representing a reference usage pattern for devices associated with the device type, the fourth data indicating a reference naming indicator associated with the devices. The process 700 may also include determining that the second data indicates that the usage pattern meets a threshold degree of similarity to the reference usage pattern. In these examples, the trigger event may result from the usage pattern meeting the threshold degree of similarity to the reference usage pattern. Additionally, the second naming indicator may comprise the reference naming indicator.

Additionally, or alternatively, the process 700 may include receiving, from a user device, user input data requesting operation of a target device having the second naming indicator, the second naming indicator including an identifier of a device type of the target device. The process 700 may also include determining, based at least in part on the user account data, that the device is associated with the device type and other devices associated with the user account data are unassociated with the device type. In these examples, the trigger event may result from determining that the device is associated with the device type and the other devices associated with the user account data are unassociated with the device type. Additionally, determining the second naming indicator may comprise determining the second naming indicator based at least in part on the user input data indicating the second naming indicator.

Additionally, or alternatively, the process 700 may include storing fourth data indicating a room naming indicator associated with devices having a reference usage pattern. The process 700 may also include determining that the second data indicates that the usage pattern meets a threshold degree of similarity to the reference usage pattern. In these examples, the trigger event may result from the usage pattern meeting the threshold degree of similarity to the reference usage pattern. Additionally, determining the second naming indicator may comprise determining the second naming indicator based at least in part on the room naming indicator.

Additionally, or alternatively, the process 700 may include determining that the first naming indicator corresponds to a predetermined naming indicator selected for renaming. The process 700 may also include determining that the usage pattern has changed by a threshold amount, the threshold amount set based at least in part on the first naming indicator corresponding to the predetermined naming indicator. In these examples, the trigger event may result from the usage pattern changing by the threshold amount.

Additionally, or alternatively, the process 700 may include determining that the second data was received during a predefined time period selected for renaming. The process 700 may also include determining that the usage pattern has changed by a threshold amount, the threshold amount set based at least in part on the predefined time period. In these examples, the trigger event may result from the usage pattern changing by the threshold amount.

Additionally, or alternatively, the process 700 may include determining that trigger event is associated with a grouping recommendation, the grouping recommendation indicating that the device is recommended to be associated with a device-group identifier. The process 700 may also include causing the device to be associated with the device-group identifier based at least in part on receiving user input data indicating acceptance of the grouping recommendation.

Additionally, or alternatively, the process 700 may include sending, based at least in part on determining that the usage pattern is associated with the trigger event, a command to output a request for information about the device. The process 700 may also include receiving audio data representing a user response to the request. The process 700 may also include generating, based at least in part on the audio data, text data corresponding to the user response. The process 700 may also include generating fourth data representing an alias naming indicator for the device, the alias naming indicator based at least in part on the text data.

Figure 8:
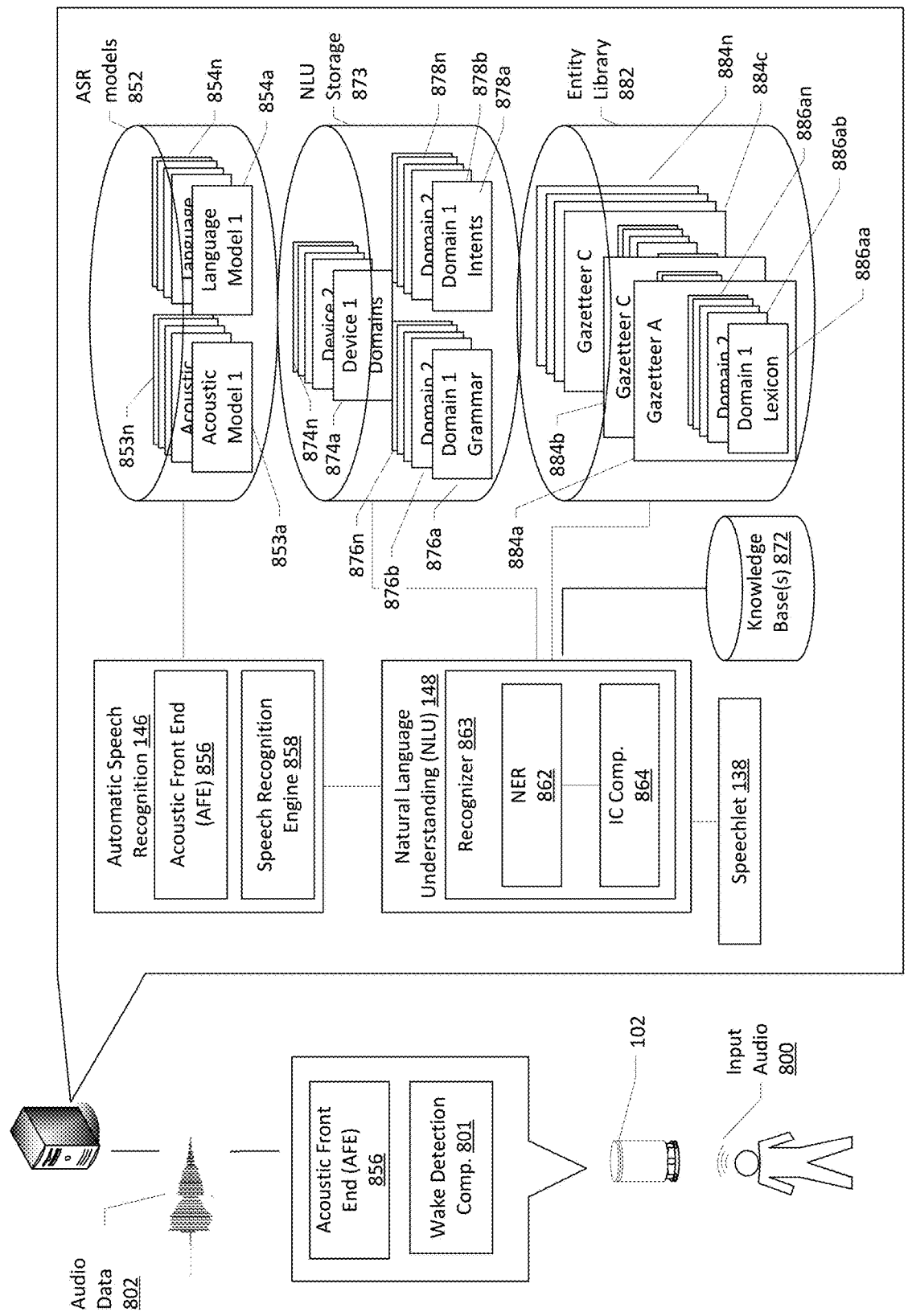
FIG. 8 illustrates a conceptual diagram of components of a speech-processing system for processing audio data provided by one or more devices.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 8 may occur directly or across a network 108. An audio capture component, such as a microphone 116 of the device 102, or another device, captures audio 800 corresponding to a spoken utterance. The device 102, using a wake word engine 801, then processes audio data corresponding to the audio 800 to determine if a keyword (such as a wakeword) is detected in the audio data. Following detection of a wakeword, the device 102 sends audio data 802 corresponding to the utterance to the remote system 106 that includes an ASR component 146. The audio data 802 may be output from an optional acoustic front end (AFE) 856 located on the device prior to transmission. In other instances, the audio data 802 may be in a different form for processing by a remote AFE 856, such as the AFE 856 located with the ASR component 146 of the remote system 106.

The wake word engine 801 works in conjunction with other components of the user device, for example a microphone to detect keywords in audio 800. For example, the device may convert audio 800 into audio data, and process the audio data with the wake word engine 801 to determine whether human sound is detected, and if so, if the audio data comprising human sound matches an audio fingerprint and/ or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 802 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 146 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 140 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system 106 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on Light A?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 858 may identify, determine, and/or generate text data corresponding to the user utterance, here "turn on Light A."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 148 (e.g., server 106) may include various components, including potentially dedicated processor(s), memory, storage, etc. As shown in FIG. 8, an NLU component 148 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 146 based on the utterance input audio 800) and attempts to make a semantic interpretation of the text. That is, the NLU process determines the meaning behind the text based on the individual words and then implements that meaning. NLU processing 148 interprets a text string to derive an intent or a desired action from the user as well as the pertinent pieces of information in the text that allow a device (e.g., device 102) to complete that action. For example, if a spoken utterance is processed using ASR 146 and outputs the text "turn on Light A" the NLU process may determine that the user intended to activate "Light A."

The NLU 148 may process several textual inputs related to the same utterance. For example, if the ASR 146 outputs N text segments (as part of an N-best list), the NLU may process all N outputs to obtain NLU results.

As will be discussed further below, the NLU process may be configured to parse and tag to annotate text as part of NLU processing. For example, for the text "turn on Light A," "turn on" may be tagged as a command (to operate an accessory device) and "Light A" may be tagged as the naming identifier of the accessory device to be operated.

To correctly perform NLU processing of speech input, an NLU process 148 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 148 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (876) framework or frameworks may correspond to sentence structures such as "purchase item called 'Item A' from Marketplace A."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "identify this song," after failing to determine which song is currently being output, the NER component 862 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 134. The destination speechlet 134 may be determined based on the NLU output. For example, if the NLU output includes a command to send a message, the destination speechlet 134 may be a message sending application, such as one located on the user device or in a message sending appliance, configured to execute a message sending command. If the NLU output includes a search request, the destination speechlet 134 may include a search engine processor, such as one located on a search server, configured to execute a search command. After the appropriate command is generated based on the intent of the user, the speechlet 134 may provide some or all of this information to a text-to-speech (TTS) engine. The TTS engine may then generate an actual audio file for outputting the audio data determined by the speechlet 134 (e.g., "okay," or "Light A on"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 148 during runtime operations where NLU operations are performed on text (such as text output from an ASR component 146). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 9:
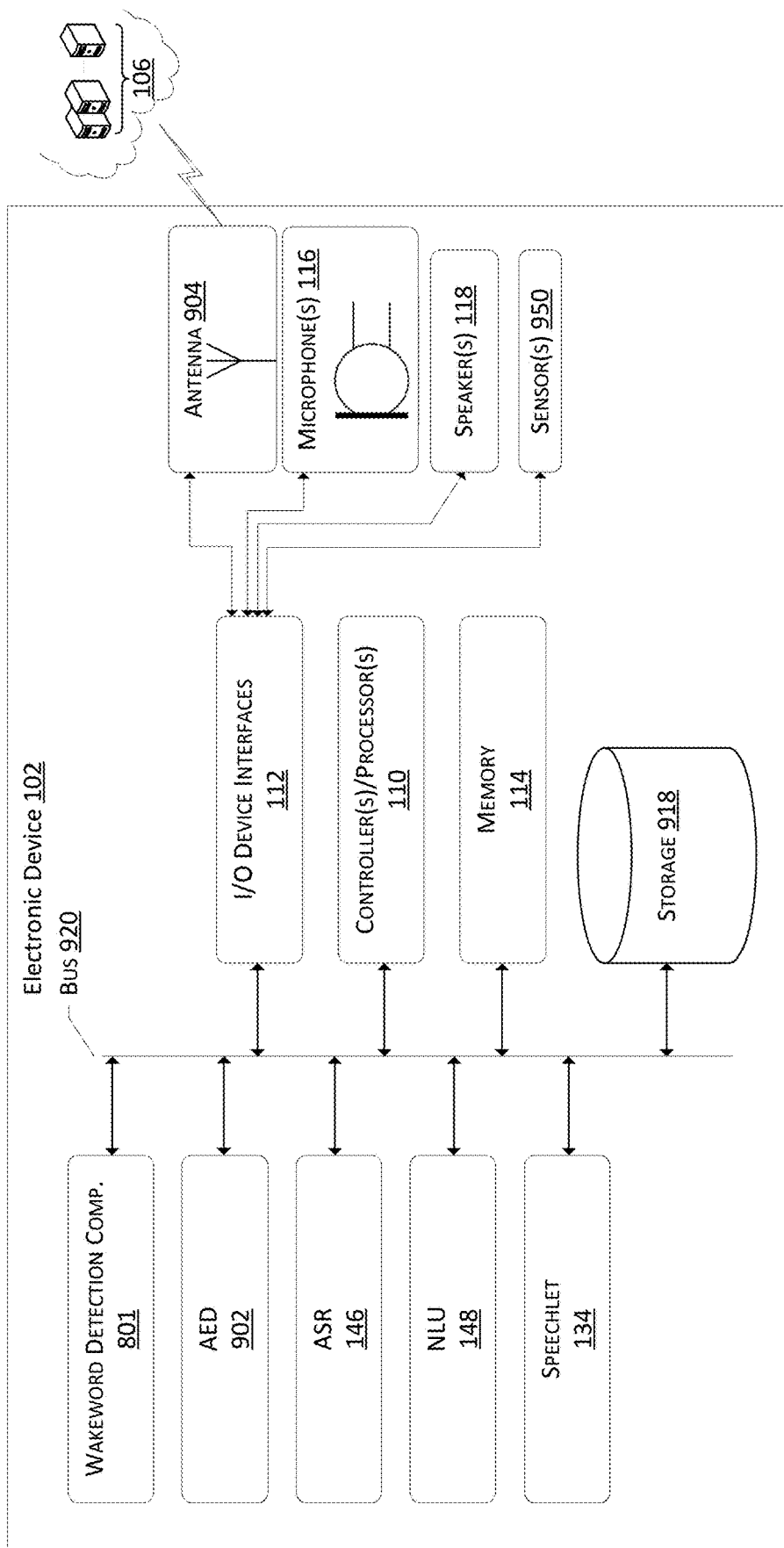
FIG. 9 illustrates a conceptual diagram of example components of an electronic device that may be utilized in association with usage-based device naming and grouping.

FIG. 9 illustrates a conceptual diagram of example components of an electronic device 102 that may be utilized in association with configurations for smart home activity modeling. The device 102 may be implemented as a stand-alone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 114, a power source, and functionality for sending generated audio data via one or more antennas 904 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 9 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 918, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 920 for conveying data among components of the respective device. Each component within a device 102 may also be directly connected to other components in addition to, or instead of, being connected to other components across the bus 920.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 801, ASR component 146, etc.) may be configured to generate audio data corresponding to captured audio. The device 102 (using input/output device interfaces 112, antenna 904, etc.) may also be configured to transmit the audio data to the remote system 106 for further processing or to process the data using internal components such as a wakeword detection component 801.

Via the antenna(s) 904, the input/output device interface 112 may connect to one or more networks 106 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 106, the speech-processing system may be distributed across a networked environment. Accordingly, the device 102 and/or the remote system 106 may include an ASR component 146. The ASR component 146 of device 102 may be of limited or extended capabilities. The ASR component 146 may include language models stored in ASR model storage component, and an ASR component 146 that performs automatic speech recognition. If limited speech recognition is included, the ASR component 146 may be configured to identify a limited number of words, such as keywords detected by the device, whereas extended speech recognition may be configured to recognize a much larger range of words.

The device 102 and/or the remote system 106 may include a limited or extended NLU component 148. The NLU component 148 of device 102 may be of limited or extended capabilities. The NLU component 148 may comprise a name entity recognition module, an intent classification module and/or other components. The NLU component 148 may also include a stored knowledge base and/or entity library, or those storages may be separately located.

In examples, AED 902 may also be performed by the device 102. In these examples, the operations may include causing the AED component 902 to be enabled or otherwise turned on, or the operations may include causing the AED component 902 to transition from a first mode to a second mode representing a higher sensitivity to audio data generated by the microphone 116. The AED component 902 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 902 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 902 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 106 may also include a speechlet 134 that is configured to execute commands/functions associated with a spoken command as described herein. The device 102 may include a wake word engine, which may be a separate component or may be included in an ASR component 146. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 118 and may utilize speaker(s) of an external or peripheral device to output audio via the speaker(s) of the external/peripheral device.

To assist with generation of usage data, for example, the device 102 may include one or more sensors 950 that may be configured to detect environmental changes indicative of user presence and/or user profile authentication. The sensors 950 may include, for example, radar, audio sensors such as the microphones 116, ultrasonic sensors, cameras, temperature sensors, motion sensors, light sensors, etc.

Figure 10:
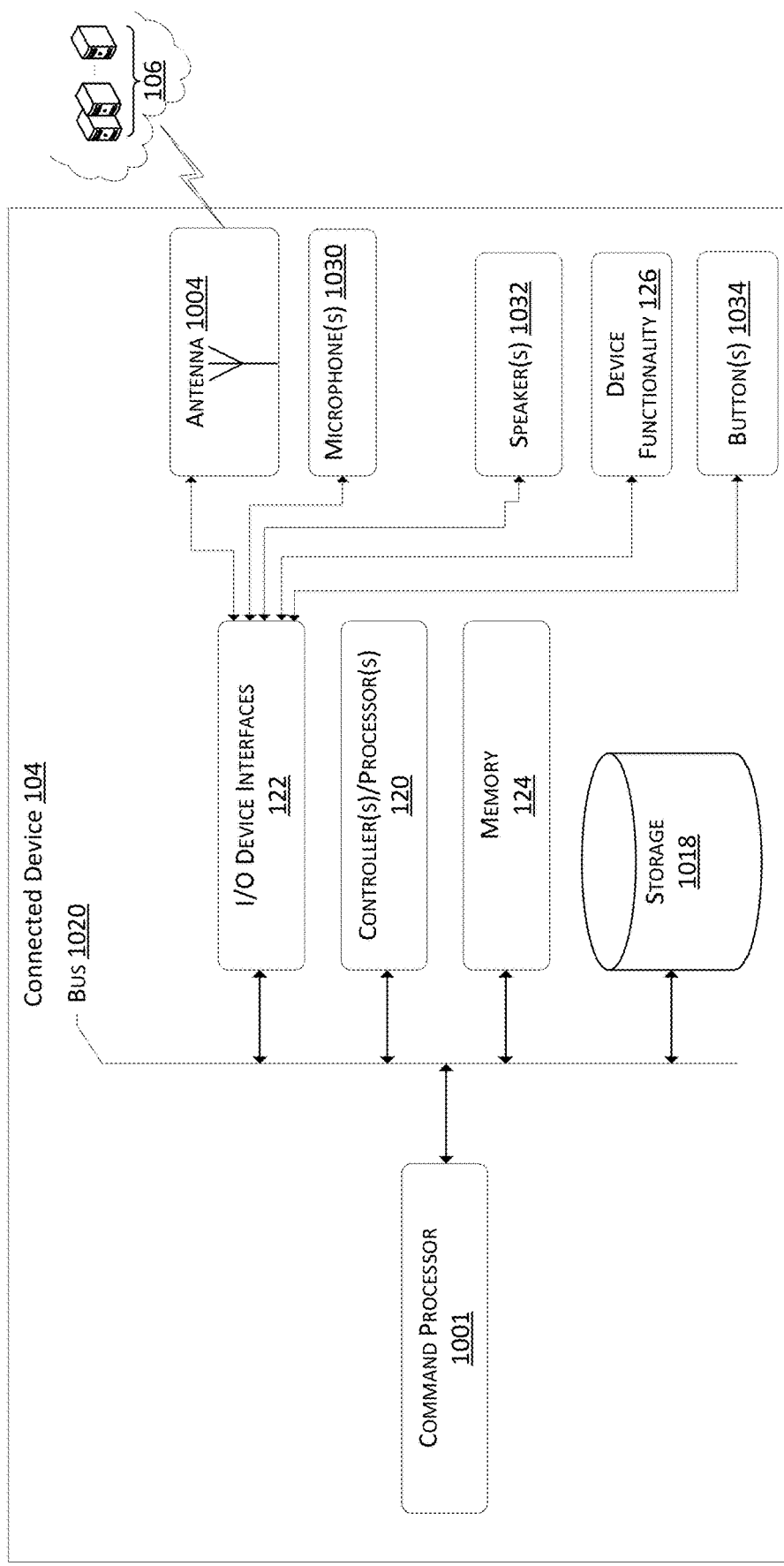
FIG. 10 illustrates a conceptual diagram of example components of a connected device that may be utilized in association with usage-based device naming and grouping.

FIG. 10 illustrates a conceptual diagram of example components of an electronic device, such as a connected device 104, utilized in association with usage-based device naming and grouping. For example, the device 104 may include voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and connected devices (e.g., lights, plugs, locks, thermostats, appliances, televisions, clocks, smoke detectors, doorbells, cameras, motion/magnetic/other security-system sensors, etc.). These electronic devices may be situated in a home, in a place a business, healthcare facility (e.g., hospital, doctor's office, pharmacy, etc.), in vehicle (e.g., airplane, truck, car, bus, etc.) in a public forum (e.g., shopping center, store, etc.), for example. The device 104 may be implemented as a stand-alone device that is relatively simple in terms of functional capabilities with limited input/output components, memory, and processing capabilities. For instance, the device 104 may not have a keyboard, keypad, touchscreen, or other form of mechanical input. In some instances, the device 104 may include a microphone 1030, a power source, and functionality for sending generated audio data via one or more antennas 1004 to another device and/or system.

The device 104 may also be implemented as a more sophisticated computing device, such as a computing device similar to, or the same as, a smart phone or personal digital assistant. The device 104 may include a display with a touch interface and various buttons for providing input as well as additional functionality such as the ability to send and receive communications. Alternative implementations of the device 104 may also include configurations as a personal computer. The personal computer may include input devices such as a keyboard, a mouse, a touchscreen, and other hardware or functionality that is found on a desktop, notebook, netbook, or other personal computing devices. In examples, the device 104 may include an automobile, such as a car. In other examples, the device 104 may include a pin on a user's clothes or a phone on a user's person. In examples, the device 104 and may not include speaker(s) 1032 and may utilize speaker(s) of an external or peripheral device to output audio via the speaker(s) of the external/peripheral device. In this example, the device 104 might represent a set-top box (STB), and the device 104 may utilize speaker(s) of another device such as a television that is connected to the STB for output of audio via the external speakers. In other examples, the device 104 may not include the microphone(s) 1030, and instead, the device 104 can utilize microphone(s) of an external or peripheral device to capture audio and/or generate audio data. In this example, the device 104 may utilize microphone(s) of a headset that is coupled (wired or wirelessly) to the device 104. These types of devices are provided by way of example and are not intended to be limiting, as the techniques described in this disclosure may be used in essentially any device that has an ability to recognize speech input or other types of natural language input.

The device 104 of FIG. 10 may include one or more controllers/processors 120, that may include a central processing unit (CPU) for processing data and computer-readable instructions, and memory 124 for storing data and instructions of the device 104. In examples, the skills and/or applications described herein may be stored in association with the memory 124, which may be queried for content and/or responses as described herein. The device 104 may also be connected to removable or external non-volatile memory and/or storage, such as a removable memory card, memory key drive, networked storage, etc., through input/output device interfaces 122.

Computer instructions for operating the device 104 and its various components may be executed by the device's controller(s)/processor(s) 120, using the memory 124 as "working" storage at runtime. A device's computer instructions may be stored in a non-transitory manner in non-volatile memory 124, storage 1018, or an external device(s). Alternatively, some or all of the executable instructions may be embedded in hardware or firmware on the device 104 in addition to or instead of software.

The device 104 may include input/output device interfaces 122. A variety of components may be connected through the input/output device interfaces 122. Additionally, the device 104 may include an address/data bus 1020 for conveying data among components of the respective device. Each component within a device 104 may also be directly connected to other components in addition to, or instead of, being connected to other components across the bus 1020.

The device 104 may include a display, which may comprise a touch interface. Any suitable display technology, such as liquid crystal display (LCD), organic light emitting diode (OLED), electrophoretic, and so on, may be utilized for the displays. Furthermore, the processor(s) 120 may comprise graphics processors for driving animation and video output on the associated display. As a way of indicating to a user that a connection between another device has been opened, the device 104 may be configured with one or more visual indicators, such as the light element(s), which may be in the form of LED(s) or similar components (not illustrated), that may change color, flash, or otherwise provide visible light output, such as for a notification indicator on the device 104. The input/output device interfaces 120 that connect to a variety of components. This wired or a wireless audio and/or video port may allow for input/output of audio/video to/from the device 104. The device 104 may also include an audio capture component. The audio capture component may be, for example, a microphone 1030 or array of microphones, a wired headset or a wireless headset, etc. The microphone 1030 may be configured to capture audio. If an array of microphones is included, approximate distance to a sound's point of origin may be determined using acoustic localization based on time and amplitude differences between sounds captured by different microphones of the array. The device 104 (using input/output device interfaces 122, antenna 1004, etc.) may also be configured to transmit audio data to the remote system 108 for processing.

Via the antenna(s) 1004, the input/output device interface 122 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 104 via wired connection to an external alternating current (AC) outlet, and/or via onboard power sources, such as batteries, solar panels, etc.

The device 104 and/or the remote system 106 may also include a command processor 1001 that is configured to execute commands/functions as described herein. For example, one or more commands may be received by the device 104 from the remote system 106 and/or from another device such as a user device and/or the audio-input device 102. The command processor 1001 may receive the commands and utilize the components of the device 104 to process those commands. Such commands may cause the device 104 to output sound, such as via the speakers 1032.

Additionally, the device 104 may include one or more buttons 1034. The buttons 1034 may allow for physical input, such as by a user of the device 104. The input may cause the processors 120 to perform one or more operations, such as causing the speakers 1032 to emit sound. The device functionality 126 may include components that configure the connected devices 104 to perform one or more operations, such as turning lights on and/or off, allowing flow of electricity and/or prohibiting flow of electricity, unlocking and/or locking, adjusting a temperature, and/or performing operations associated with appliances, televisions, clocks, smoke detectors, doorbells, cameras, security-system sensors, etc.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
one or more processors; and
non-transitory computer-readable media storing instructions that, when executed by the one or more processors, cause the one or more processors to perform operations comprising:
  determining that a trigger event associated with a device has occurred;
  causing, based at least in part on the trigger event, output of a request for user input associated with the device;
  receiving user input data corresponding to the user input;
  generating, based at least in part on user input data, first data indicating a naming identifier for the device; and
  storing the first data in association with user account data.

2. The system of claim 1, wherein:
the trigger event comprises detection of a wake word from first audio data;
causing output of the request comprises causing output of audio representing the request; and
the user input comprises second audio data responsive to the audio representing the request.

3. The system of claim 2, the operations further comprising:
performing automatic speech recognition on the second audio data such that text data representing the user input is generated;
identifying a portion of the text data predefined as being associated with device naming; and
wherein generating the first data comprises generating the first data utilizing the portion of the text data predefined as being associated with device naming.

4. The system of claim 1, the operations further comprising:
generating, based at least in part on the user input data, second data indicating a device group to associate with the device; and
storing the second data in association with the user account data.

5. The system of claim 1, the operations further comprising receiving a request to operate the device, and wherein determining that the trigger event associated with the device has occurred is based at least in part on receiving the request to operate the device.

6. The system of claim 1, wherein the trigger event includes detecting a degree of change in a usage pattern of the device that satisfies a threshold degree of change in the usage pattern.

7. The system of claim 1, wherein the trigger event includes determining that a device name of the device includes a word predefined to be associated with seasonal usage of the device.

8. The system of claim 1, the operations further comprising receiving feedback data indicating that improper targeting of the device using voice commands has occurred, and wherein the trigger event comprises receiving the feedback data.

9. The system of claim 1, the operations further comprising determining a device type of the device, and wherein the trigger event comprises determining that the device type corresponds to a predefined device type associated with temporary use of the device.

10. The system of claim 1, the operations further comprising causing the device to transition from a first device state to a second device state, and wherein the trigger event comprises causing the device to transition from the first device state to the second device state.

11. A method comprising:
determining that a trigger event associated with a device has occurred;
causing, based at least in part on the trigger event, output of a request for user input associated with the device;
receiving user input data corresponding to the user input;
generating, based at least in part on user input data, first data indicating a naming identifier for the device; and
storing the first data in association with user account data.

12. The method of claim 11, wherein:
the trigger event comprises detection of a wake word from first audio data;
causing output of the request comprises causing output of audio representing the request; and
the user input comprises second audio data responsive to the audio representing the request.

13. The method of claim 12, further comprising:
performing automatic speech recognition on the second audio data such that text data representing the user input is generated;
identifying a portion of the text data predefined as being associated with device naming; and
wherein generating the first data comprises generating the first data utilizing the portion of the text data predefined as being associated with device naming.

14. The method of claim 11, further comprising:
generating, based at least in part on the user input data, second data indicating a device group to associate with the device; and
storing the second data in association with the user account data.

15. The method of claim 11, further comprising receiving a request to operate the device, and wherein determining that the trigger event associated with the device has occurred is based at least in part on receiving the request to operate the device.

16. The method of claim 11, wherein the trigger event includes detecting a degree of change in a usage pattern of the device that satisfies a threshold degree of change in the usage pattern.

17. The method of claim 11, wherein the trigger event includes determining that a device name of the device includes a word predefined to be associated with seasonal usage of the device.

18. The method of claim 11, further comprising receiving feedback data indicating that improper targeting of the device using voice commands has occurred, and wherein the trigger event comprises receiving the feedback data.

19. The method of claim 11, further comprising determining a device type of the device, and wherein the trigger event comprises determining that the device type corresponds to a predefined device type associated with temporary use of the device.

20. The method of claim 11, further comprising causing the device to transition from a first device state to a second device state, and wherein the trigger event comprises causing the device to transition from the first device state to the second device state.

* * * * *